(12) United States Patent
Ganesan et al.

(10) Patent No.: US 12,071,570 B2
(45) Date of Patent: Aug. 27, 2024

(54) MULTILAYER TAPE CONSTRUCTIONS FOR LOW-TEMPERATURE VIBRATION DAMPING WITH TUNABLE ADHESION

(71) Applicant: Avery Dennison Corporation, Mentor, OH (US)

(72) Inventors: Mahesh Ganesan, Beachwood, OH (US); Henry Milliman, Willoughby, OH (US); Joseph L. Meckler, Cleveland, OH (US)

(73) Assignee: Avery Dennison Corporation, Mentor, OH (US)

( * ) Notice: Subject to any disclaimer, the term of this patent is extended or adjusted under 35 U.S.C. 154(b) by 459 days.

(21) Appl. No.: 17/297,595

(22) PCT Filed: Nov. 26, 2019

(86) PCT No.: PCT/US2019/063323
§ 371 (c)(1),
(2) Date: May 27, 2021

(87) PCT Pub. No.: WO2020/112824
PCT Pub. Date: Jun. 4, 2020

(65) Prior Publication Data
US 2022/0049130 A1    Feb. 17, 2022

Related U.S. Application Data

(60) Provisional application No. 62/771,822, filed on Nov. 27, 2018.

(51) Int. Cl.
*C09J 7/30* (2018.01)
*C09J 7/29* (2018.01)
*C09J 7/40* (2018.01)

(52) U.S. Cl.
CPC . *C09J 7/30* (2018.01); *C09J 7/29* (2018.01); *C09J 7/40* (2018.01); *C09J 2301/122* (2020.08);
(Continued)

(58) Field of Classification Search
CPC ......... C09J 7/30; C09J 7/29; C09J 7/40; C09J 2301/122; C09J 2301/124; C09J 2301/30;
(Continued)

(56) References Cited

U.S. PATENT DOCUMENTS 5,796,055 A    8/1998    Benson, Jr. et al.
5,858,521 A    1/1999    Okuda et al.
(Continued)

FOREIGN PATENT DOCUMENTS

CN    102186939    9/2011
CN    104619770    5/2015
(Continued)

OTHER PUBLICATIONS

International Preliminary Report on Patentability dated May 25, 2021 issued in corresponding IA No. PCT/US2019/063323 filed Nov. 26, 2019.
(Continued)

*Primary Examiner* — Patricia L. Nordmeyer

(57) ABSTRACT

Provided herein are multilayer tape constructions comprising a damping layer and a bonding layer, wherein the multilayer tape construction effectively dissipates vibrations at low temperatures. The materials and configurations of the layers are selected such that the glass transition temperature of the bonding layer is greater than the glass transition of the damping layer, and the difference between the glass transition temperatures is related to the relative thicknesses of the damping layer and the bonding layer. The multilayer tape constructions may further comprise a carrier layer. Also
(Continued)

provided are systems and methods using the disclosed multilayer tape constructions.

33 Claims, 10 Drawing Sheets

(52) U.S. Cl.
CPC ...... *C09J 2301/124* (2020.08); *C09J 2301/30* (2020.08); *C09J 2433/00* (2013.01); *C09J 2483/00* (2013.01)

(58) Field of Classification Search
CPC ............... C09J 2433/00; C09J 2483/00; C09J 2301/1242; C09J 2301/208; C09J 2301/312; C09J 2421/00; C09J 7/10
See application file for complete search history.

(56) References Cited

U.S. PATENT DOCUMENTS

| | | |
|---|---|---|
| 6,177,173 B1 | 1/2001 | Nelson |
| 6,251,493 B1 | 6/2001 | Johnson et al. |
| 6,576,316 B2 | 6/2003 | Simons et al. |
| 6,723,401 B1 | 4/2004 | Mcknight et al. |
| 6,790,520 B1 | 9/2004 | Todd et al. |
| 7,029,550 B2 | 4/2006 | Kiuchi et al. |
| 7,147,743 B2 | 12/2006 | Kiuchi et al. |
| 7,166,678 B2 | 1/2007 | Dunlap et al. |
| 7,181,891 B2 | 2/2007 | Surace et al. |
| 7,322,440 B2 | 1/2008 | Khan et al. |
| 7,514,143 B2 | 4/2009 | Matsumura et al. |
| 7,789,197 B2 | 9/2010 | Duval et al. |
| 7,798,287 B1 | 9/2010 | Surace et al. |
| 7,921,965 B1 | 4/2011 | Surace |
| 7,981,243 B2 | 7/2011 | Xiao |
| 8,051,947 B2 | 11/2011 | Karayianni |
| 8,066,097 B2 | 11/2011 | Boyadjian et al. |
| 8,127,889 B1 | 3/2012 | Mathur |
| 8,181,417 B2 | 5/2012 | Surace et al. |
| 8,181,738 B2 | 5/2012 | Tinianov et al. |
| 8,377,553 B2 | 2/2013 | Xiao |
| 8,448,389 B2 | 5/2013 | Doneux et al. |
| 8,449,962 B2 | 5/2013 | Prenzel et al. |
| 8,479,876 B2 | 7/2013 | Fetsko et al. |
| 8,501,306 B2 | 8/2013 | Nagasaki et al. |
| 8,695,757 B2 | 4/2014 | Duval et al. |
| 9,033,102 B2 | 5/2015 | Payot et al. |
| 9,109,141 B2 | 8/2015 | Inenaga |
| 9,127,739 B2 | 9/2015 | Locke et al. |
| 9,153,261 B1 | 10/2015 | Kerner et al. |
| 9,243,402 B2 | 1/2016 | Stopin et al. |
| 9,330,697 B2 | 5/2016 | Miller et al. |
| 9,368,129 B1 | 6/2016 | Hahn et al. |
| 9,469,256 B2 | 10/2016 | Billy |
| 9,524,711 B2 | 12/2016 | Owen, Jr. et al. |
| 9,541,061 B2 | 1/2017 | Sievers et al. |
| 9,546,946 B2 | 1/2017 | Golovanevsky et al. |
| 9,685,189 B1 | 6/2017 | Harper et al. |
| 9,725,154 B2 | 8/2017 | Chin et al. |
| 9,827,749 B2 | 11/2017 | Egger et al. |
| 2001/0044023 A1 | 11/2001 | Johnson et al. |
| 2004/0173529 A1 | 9/2004 | Da Costa et al. |
| 2005/0126848 A1 | 6/2005 | Slavoshai et al. |
| 2006/0040096 A1 | 2/2006 | Eadara et al. |
| 2007/0017739 A1 | 1/2007 | Yamagiwa et al. |
| 2009/0233069 A1 | 9/2009 | Merlette et al. |
| 2010/0206662 A1 | 8/2010 | Mitsuoka et al. |
| 2011/0104483 A1 | 5/2011 | Shinozaki et al. |
| 2011/0139542 A1 | 6/2011 | Borroni |
| 2013/0236711 A1 | 9/2013 | Lu |
| 2014/0209229 A1 | 7/2014 | Yang |
| 2014/0224577 A1 | 8/2014 | Pathak et al. |
| 2015/0004405 A1 | 1/2015 | Clapper et al. |
| 2015/0147511 A1 | 5/2015 | Parloo et al. |
| 2015/0224750 A1 | 8/2015 | Visiolo et al. |
| 2015/0225111 A1 | 8/2015 | Duisken et al. |
| 2015/0352820 A1 | 12/2015 | Duisken et al. |
| 2016/0031195 A1 | 2/2016 | Landmann et al. |
| 2016/0153187 A1 | 6/2016 | Desai et al. |
| 2016/0159050 A1 | 6/2016 | Lu et al. |
| 2016/0309260 A1 | 10/2016 | Bohm et al. |
| 2017/0028687 A1 | 2/2017 | Derosa et al. |
| 2017/0175848 A1 | 6/2017 | Timmons et al. |
| 2017/0210097 A1 | 7/2017 | Payen et al. |
| 2017/0261059 A1 | 9/2017 | Muranaka |
| 2018/0082669 A1 | 3/2018 | Lu |

FOREIGN PATENT DOCUMENTS

| | | |
|---|---|---|
| CN | 104144783 | 9/2016 |
| EP | 2341112 | 7/2011 |
| EP | 2557132 | 2/2013 |
| JP | 2013-018242 | 1/2013 |
| WO | 2014/130507 | 8/2014 |
| WO | 2016/106040 | 6/2016 |
| WO | 2018/057570 | 3/2018 |

OTHER PUBLICATIONS

International Search Report and Written Opinion dated Jul. 2, 2020 issued in corresponding IA No. PCT/US2019/063323 filed Nov. 26, 2019.

Riesen et al., "The glass transition temperature measured by different TA techniques. Part 2: Determination of glass transition temperature," Jan. 1, 2003, 20 pages, http://de.mt.com/global/en/home/supportive_content/usercom/TA_UserCom18.z2vUzxjPyOvKAxrVCMLHBfbHCI4YmJC2mq-.MediaFileComponent.html/tauserc18e.pdf.

MULTILAYER TAPE CONSTRUCTIONS FOR LOW-TEMPERATURE VIBRATION DAMPING WITH TUNABLE ADHESION

CROSS REFERENCE TO RELATED APPLICATIONS

The present application is a 371 of International Application No. PCT/US2019/063323, which was published in English on Jun. 4, 2020, and claims the benefit of U.S. Provisional Patent Application No. 62/771,822 filed Nov. 27, 2018, both of which are incorporated herein by reference in their entireties.

FIELD

The present disclosure relates generally to multilayer tape constructions useful for dissipating vibrations.

BACKGROUND

There is a need in many markets, e.g., the automotive market, the home appliance market, and the electronics market, for the reduction of undesired vibrations and associated noise generation. As an example, the automotive industry is trending towards an increased adoption of lighter weight vehicles. As such, there has been an increased use of lighter weight aluminum and polymer materials. The use of these designs and materials, however, leads to additional issues relating to vehicle vibration and vibration-related noise.

Generally, the noise and vibration issues have been managed through two approaches: the stiffening of the structure geometry to be more resistant to vibration, and the damping of the structure to reduce the vibration amplitude. Along with these solutions, acoustic technologies can be used to absorb, reflect, and isolate sound waves from their source, for example before they reach a passenger in an automotive cabin.

Structural damping approaches can involve the application of damping tapes or laminates that can include a stiffening or constraining carrier material and a damping material. The effectiveness of damping tapes in dissipating vibrations can depend on both the frequency of the vibrations to be dissipated, and the temperature of damping tape application or system that includes the damping tape. In particular, conventional damping tapes provide vibration damping over only a relatively narrow temperature range that may not include lower standard operating temperatures of the structure to be dampened. As a result, a need remains for tape constructions that effectively and efficiently dampen or reduce vibrations at lower temperatures.

SUMMARY

In one embodiment, the disclosure is to a multilayer tape construction comprising a damping layer and a bonding layer. The glass transition temperature of the bonding layer is greater than the glass transition of the damping layer. In some embodiments, the difference between the bonding layer glass transition temperature and the damping layer glass transition temperature is less than $(80\pm40)(H_d/H_b)^{(0.6\pm0.2)}$° C., wherein $H_d$ is the thickness of the damping layer and $H_b$ is the thickness of the bonding layer, both in meters. In some embodiments, the difference between the bonding layer glass transition temperature and the damping layer glass transition temperature is less than $(60\pm40)(H_d/H_b)^{(0.3\pm0.2)}$° C. Preferably, the peak composite loss factor of the multilayer tape construction at 200 Hz is at temperatures less than 0° C. In some embodiments, the peel adhesion of the multilayer tape construction is greater than 10 N/25 mm. In certain aspects, the shear adhesion failure temperature (also referred to as SAFT herein) of the multilayer tape construction is greater than 115° C. Preferably, the viscoelastic loss factor of the damping layer is greater than or equal to $(10^{-10}H_d^{-2.5}\pm0.25)$ as measured over a target operating temperature range or over a target operating frequency range.

In another embodiment, the multilayer tape construction may further comprise a carrier layer wherein at least a portion of which is at least partially disposed between the damping layer and the carrier layer. In yet another embodiment, the multilayer tape construction may further comprise at least one additional carrier layer. In some embodiments, the multilayer tape construction may further comprise at least one additional bonding layer. In other embodiments, the multilayer tape construction may further comprise at least one additional damping layer.

In some embodiments, the extensional stiffness of the carrier layer is utmost three-fold less than that the extensional stiffness of the substrate, the bonding layer glass transition temperature is at least 25° C. greater than the damping layer glass transition temperature, and the maximum value of the damping layer viscoelastic loss factor is at least 2 greater than the maximum value of the bonding layer viscoelastic loss factor.

In some embodiments, the difference between the bonding layer glass transition temperature and the damping layer glass transition temperature is less than 25° C., the damping layer thickness is greater than or equal to the bonding layer thickness, and the maximum value of the damping layer viscoelastic loss factor is at least 1.5 greater than the maximum value of the bonding layer viscoelastic loss factor. In some embodiments, the difference between the bonding layer glass transition temperature and the damping layer glass transition temperature is less than 25° C., the damping layer thickness is less than the bonding layer thickness, and the maximum value of the damping layer viscoelastic loss factor is at least 2 greater than the maximum value of the bonding layer viscoelastic loss factor.

In another embodiment the disclosure relates to a system comprising a multilayer tape construction and a base substrate. The multilayer tape comprises a damping layer and a bonding layer. The bonding layer glass transition temperature is greater than the damping layer glass transition temperature, wherein the difference between the glass transition temperatures is less than $(80\pm40)(H_d/H_b)^{(0.6\pm0.2)}$° C. In yet another embodiment, the system further comprises a carrier layer. The extensional stiffness of the carrier layer is at least 3-fold smaller than the extensional stiffness of the base substrate.

In another embodiment, the disclosure relates to another system comprising a multilayer tape construction and a base substrate. The multilayer tape construction comprises a damping layer, a bonding layer. The bonding layer glass transition temperature is greater than the damping layer glass transition temperature, wherein the difference between the glass transition temperatures is less than $(60\pm40)(H_d/H_b)^{(0.3\pm0.2)}$° C. In yet another embodiment, the system further comprises a carrier layer. The extensional stiffness of the carrier layer is utmost 3-fold smaller than the extensional stiffness of the base substrate.

In another embodiment, the disclosure relates to a method of reducing a vibration to a substrate. The method comprises providing a base substrate that is subject to a vibration. The method further comprises connecting the base substrate to the bonding layer of a multilayer tape construction as disclosed herein. Preferably, the vibration of the base structure is dissipated at a temperature less than 10° C.

BRIEF DESCRIPTION OF DRAWINGS

The disclosure references the appended drawings, wherein like numerals designate similar parts.

DETAILED DESCRIPTION

Figure 1A:
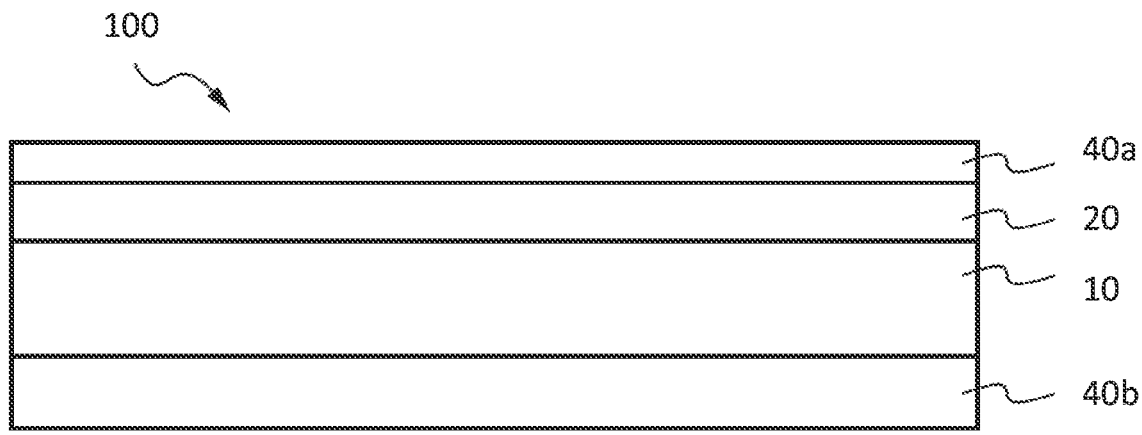
FIG. 1A illustrates an exemplary configuration of the multi-layer tape construction as disclosed herein.

The present disclosure generally relates to multilayer tape constructions that, when attached to a structure subject to a vibration, are advantageously capable of effectively dissipating the vibration at low temperatures (the term "low temperature" is described herein as temperatures below about 0° C.), while maintaining good adhesion to the structure wherein the adhesion can be tuned without affecting the capability to dissipate vibrations at low temperature. For example, it is beneficial for a damping tape to reduce undesired vibrations of structures, as these vibrations can decrease the stability of the structure, increase fatigue and stress, shorten an operational lifetime, and promote undesired vibration side effects, such as the generation of noise or the discomfort of vehicle passengers.

Conventionally, viscoelastic damping materials are used in constrained layer damping (CLD) treatments that consist of one or more damping material layers and constraining layers. The damping performances of a CLD treatment and its component damping layers can be described in terms of their composite loss factor (CLF) properties. The composite loss factor of a material or device is a measure of its ability to convert vibrational energy to thermal energy. As a general practice, the materials or compositions of individual layers selected as being highly damping can have material loss factors of 0.8 or larger. In a layered construction, the total composite loss factor of the overall construction is generally considered effective at values of 0.05, 0.1, or larger.

The composite loss factor varies with both vibrational frequency and temperature, and for a given frequency a curve can be plotted of the composite loss factor versus temperature. The maximum value of this curve for the composite loss factor versus temperature can be referred to as the composite loss factor peak at the given frequency, and the width of the portion of the curve having a composite loss factor greater than 0.1 can be referred to as the composite loss factor width. The damping efficiency of a particular damping treatment at a given vibrational frequency can then be calculated with the equation:

$$\xi = \frac{W \times M}{\rho_A}$$

wherein $\xi$ is the damping efficiency index, W is the damping temperature range in ° C., M is the peak damping value, and $\rho_A$ is the linear density in kg/m.

Typically, when a CLD treatment or tape is applied to a vibrating substrate, the viscoelastic damping material, such as an adhesive polymer, is placed in direct contact with the vibrating substrate. As a result, the polymeric damping materials of these conventional tapes need to demonstrate good adhesion properties that promote bonding to the substrate. Through this bond, the vibrations from the substrate are transferred to the damping material, which can absorb and dissipate vibrational energies through shear deformations induced by the constraining layer. In the vicinity of the glass transition regime of the polymeric damping material, the vibrations are lost as thermal energy by virtue of molecular motions of the adhesive polymer chains, thereby leading to an energy loss which in turns results in a damping of the amplitudes of vibration. Therefore, in such a construction, vibrational damping is maximal only at temperatures near that of the glass transition temperature of the adhesive. This causes a damping temperature range of the composite loss factor curve that is narrowly positioned around the damping material glass transition temperature at the vibrational frequencies of interest.

Conventional CLD treatments are often used to suppress resonant vibrations in substrates over temperatures that range from about 0° C. to about 80° C., as there are commonly available materials having both glass transition temperatures and adequate adhesive properties within this range. There is significant interest, however, in broadening the scope of damping treatments and tapes, increasing their usefulness to damp vibrations at low temperatures, i.e., below about 0° C. One approach to enabling low temperature damping is to modify the glass transition temperature of the damping material to be significantly below about 0° C. However, it is well understood that such modifications in damping material rheology also lead to reductions in adhesive performance, such as decreases in peel adhesion and/or shear adhesion. The decrease in peel adhesion is caused by a shift in the glass-rubber transition of the viscoelastic damping material away from debonding shear-rates, while the decrease in shear adhesion is due to a lower long-time modulus which is necessary to achieve sufficient wet-out for intimate adhesive bonding to occur. Conversely, shifting the damping material rheology to instead improve adhesion will adversely affect the low-temperature damping performance, also preventing the material from simultaneously meeting damping and adhesion target.

Another approach to enable low temperature damping involves at least partially laminating a high glass transition temperature viscoelastic skin layer to the damping material layer, in order to compensate for the poor adhesion performance of the latter. However, in such a configuration the stability of the interface between the skin layer and the damping layer may be dependent on the compatibility of the skin and damping polymers, potentially placing an undesired constraint on design flexibility. Furthermore, the high glass transition temperature of the skin layer often has the counterproductive effect of shifting the damping towards a higher temperature, leading to a loss in damping performance at low temperatures. In many embodiments, the design rules described herein also describe the damping treatment consisting of a high glass transition temperature viscoelastic skin layer at least partially laminated to the damping material layer. The rheological differentiators disclosed may allow for localization of damping and bonding to the damping layer and bonding layer respectively even in the absence of a carrier layer or other intermediary layer disposed between the damping layer and bonding layer or when the carrier layer or other intermediary layer is at least partially disposed between the damping layer and bonding layer.

Described herein are multilayer tape constructions comprising a viscoelastic damping layer and a viscoelastic bonding layer with particular differentiated rheological properties surprisingly allows for damping performance to be localized to the damping layer, and bonding performance to be governed by the bonding layer. The identified relationships between the damping layer and bonding layer properties provide parameters that can be used to select viscoelastic materials that can be arranged in the disclosed configurations according to specific design criteria. This allows for the design and construction of multilayer tapes that can be tuned to meet target adhesion requirements without suffering a loss in low-temperature damping efficiency, or vice versa. The provided multilayer tapes can be used in, for example, a constrained layer damping setting or in a peel-and-stick foil tape construction.

In one embodiment, a multilayer tape construction is disclosed. The multilayer tape construction comprises a damping layer and a bonding layer. In many embodiments, the multilayer tape construction comprises a damping layer having a damping layer glass transition temperature $(T_{g,d})$, a damping layer thickness $(H_d)$, and a damping layer viscoelastic loss factor $(\tan(\delta)_d)$ and a bonding layer having a bonding layer glass transition temperature $(T_{g,b})$, a bonding layer thickness $(H_b)$, and a bonding layer viscoelastic loss factor $(\tan(\delta)_b)$, wherein $T_{g,b}$ is greater than or equal to $T_{g,d}$. In some embodiments, the multilayer tape construction comprises at least one damping layer and at least one bonding layer. In certain aspects, each layer of the multilayer film is substantially coextensive with one another.

By properly configuring the damping layer and the bonding layer to have differentiated rheological parameters as a function of the layer thicknesses, the multilayer tape construction can be designed such that the damping performance of the tape can be localized to the damping layer, and the adhesion performance of the tape can be localized to the bonding layer. This effective decoupling of damping and adhesion into separate layers advantageously provides the multilayer tape with low-temperature damping, simultaneously combined with high performance, tuneable adhesion. Importantly, the damping and adhesion performances of the multilayer film are not only highly effective at low temperatures, but also can be independently tuned without compromising one another, in order to meet particular application requirements. This enhanced adaptability and robustness further increases the usefulness of the tapes, systems, and methods disclosed herein.

The damping layer of the multilayer construction is characterized in part by a damping layer glass transition temperature $(T_{g,d})$, a damping layer thickness $(H_d)$, and a damping layer viscoelastic loss factor $(\tan(\delta)_d)$. The bonding layer of the multilayer tape construction is characterized in part by a bonding layer glass transition temperature $(T_{g,d})$, a bonding layer thickness $(H_b)$, and a bonding layer viscoelastic loss factor $(\tan(\delta)_b)$. To localize the damping properties of the multilayer tape to the damping layer, its glass transition temperature $(T_{g,d})$ should be sufficiently separated from that of the bonding layer $(T_{g,b})$ to ensure no overlap in damping regimes. More specifically, the bonding layer glass transition temperature should be greater than the damping layer glass transition temperature, with the difference between the two determined at least in part by the thicknesses of these two different layers.

In another embodiment, the multilayer tape construction may further comprise a carrier layer. In some embodiments, a carrier layer is at least partially disposed between a damping layer and a bonding layer. In some embodiments, one face of the carrier layer is in at least partial contact with a bonding layer, and an opposite face of the carrier layer is in at least partial contact with a damping layer. In other embodiments, at least a portion of the damping layer is in direct contact with at least a portion of the carrier layer.

Further, by properly configuring the damping layer and the bonding layer to have differentiated rheological parameters as a function of the properties of the carrier layer, the multilayer tape construction can also be designed such that the damping performance of the tape can be localized to the damping layer, and the adhesion performance of the tape can be localized to the bonding layer. This effective decoupling of damping and adhesion into separate layers advantageously provides the multilayer tape with low-temperature damping, simultaneously combined with high performance, tuneable adhesion. Importantly, the damping and adhesion performances of the multilayer film are not only highly effective at low temperatures, but also can be independently tuned without compromising one another, in order to meet particular application requirements. This enhanced adaptability and robustness further increases the usefulness of the tapes, systems, and methods disclosed herein.

In other embodiments, the multilayer tape construction may further comprise at least one additional carrier layer. The layers of the multilayer tape construction may be arranged such that at least a portion of each carrier layer is at least partially disposed between a damping layer and a bonding layer. In certain aspects, each layer of the multilayer film is substantially coextensive with one another. In some embodiments, one face of the carrier layer is in direct contact with a bonding layer, and one face of at least one additional carrier layer is in direct contact with a damping layer. In some embodiments, the multilayer tape construction may further comprise at least one additional bonding layer. In other embodiments, the multilayer tape construction may further comprise at least one additional damping layer. The arrangement of at least one additional carrier layer, at least one additional bonding layer, and/or at least one additional damping layer may vary within the multilayer tape construction and limitless multilayer tape constructions can be prepared from at least one damping layer, at least one bonding layer, and at least one carrier layer. In one example, the carrier layer is a first carrier layer and at least one additional carrier layer is a second carrier layer, wherein at least a portion of which is disposed between the damping layer and the bonding layer. In another example, the second carrier layer described above is arranged within the multilayer tape construction such that at least a portion of the second carrier layer is disposed between the damping layer and at least one additional bonding layer.

Furthermore, in addition to properties of the damping layer and the bonding layer, the presence and properties of the carrier layer can also influence overlap in damping regimes. For example, if the carrier layer is sufficiently stiff, then it can inadvertently induce increased shear strain in the bonding layer by effectively acting as its constraining layer. This would act to prevent the localization of damping to the damping layer alone. To avoid this occurrence and to maximally localize damping to the damping layer, the glass transition regions of the viscoelastic layers, e.g., the damping layer and the bonding layer, can be not only set sufficiently far apart, but also designed based on the viscoelastic layer thicknesses and the properties of the carrier layer as follows.

Damping Layer and Bonding Layer Glass Transition Temperatures

In some embodiments, the extensional stiffness per unit width of the carrier layer is sufficiently low that it is less than or equal to about one-third of the extensional stiffness per unit width of the substrate to which the multilayer tape construct will be applied. In mathematical notation for this case: $K_S/K_{CL} \geq 3$. For such embodiments, the glass transition temperatures of the bonding layer and the damping layer can be set such that the difference between the glass transition temperatures is less than $(80\pm40)(H_d/H_b)^{(0.6\pm0.2)}$° C. The maximum difference between the bonding layer glass transition temperature and the damping layer glass transition temperature can, for example, range from $40(H_d/H_b)^{(0.6\pm0.2)}$° C. to $120(H_d/H_b)^{(0.6\pm0.2)}$° C., e.g., from $40(H_d/H_b)^{(0.6\pm0.2)}$° C. to $88(H_d/H_b)^{(0.6\pm0.2)}$° C., from $48(H_d/H_b)^{(0.6\pm0.2)}$° C. to $96(H_d/H_b)^{(0.6\pm0.2)}$° C., from $56(H_d/H_b)^{(0.6\pm0.2)}$° C. to $104(H_d/H_b)^{(0.6\pm0.2)}$° C., from $64(H_d/H_b)^{(0.6\pm0.2)}$° C. to $112(H_d/H_b)^{(0.6\pm0.2)}$° C., or from $72(H_d/H_b)^{(0.6\pm0.2)}$° C. to $120(H_d/H_b)^{(0.6\pm0.2)}$° C. In terms of upper limits, the maximum glass transition temperature can be less than $112(H_d/H_b)^{(0.6\pm0.2)}$° C., less than $104(H_d/H_b)^{(0.6\pm0.2)}$° C., less than $96(H_d/H_b)^{(0.6\pm0.2)}$° C., less than $88(H_d/H_b)^{(0.6\pm0.2)}$° C., less than $80(H_d/H_b)^{(0.6\pm0.2)}$° C., less than $72(H_d/H_b)^{(0.6\pm0.2)}$° C., less than $64(H_d/H_b)^{(0.6\pm0.2)}$° C., less than $56(H_d/H_b)^{(0.6\pm0.2)}$° C., or less than $48(H_d/H_b)^{(0.6\pm0.2)}$° C.

In some embodiments, the extensional stiffness ($K_{CL}$) per unit width of the optional carrier layer is sufficiently high that it is greater than one-third of the extensional stiffness ($K_S$) per unit width of the substrate to which the multilayer tape construct will be applied. In mathematical notation for this case: $K_S/K_{CL} < 3$. For such embodiments, the glass transition temperatures of the bonding layer and the damping layer can be set such that the difference between the glass transition temperatures is less than $(60\pm40)(H_d/H_b)^{(0.3\pm0.2)}$° C. The maximum difference between the bonding layer glass transition temperature and the damping layer glass transition temperature can, for example, range from $20(H_d/H_b)^{(0.3\pm0.2)}$° C. to $100(H_d/H_b)^{(0.3\pm0.2)}$° C., e.g., from $20(H_d/H_b)^{(0.3\pm0.2)}$° C. to $68(H_d/H_b)^{(0.3\pm0.2)}$° C., from $28(H_d/H_b)^{(0.3\pm0.2)}$° C. to $76(H_d/H_b)^{(0.3\pm0.2)}$° C., from $36(H_d/H_b)^{(0.3\pm0.2)}$° C. to $84(H_d/H_b)^{(0.3\pm0.2)}$° C., from $44(H_d/H_b)^{(0.3\pm0.2)}$° C. to $92(H_d/H_b)^{(0.3\pm0.2)}$° C., or from $52(H_d/H_b)^{(0.3\pm0.2)}$° C. to $100(H_d/H_b)^{(0.3\pm0.2)}$° C. In terms of upper limits, the maximum glass transition temperature difference can be less than $92(H_d/H_b)^{(0.3\pm0.2)}$° C., less than $84(H_d/H_b)^{(0.3\pm0.2)}$° C., less than $76(H_d/H_b)^{(0.3\pm0.2)}$° C., less than $68(H_d/H_b)^{(0.3\pm0.2)}$° C., less than $60(H_d/H_b)^{(0.3\pm0.2)}$° C., less than $52(H_d/H_b)^{(0.3\pm0.2)}$° C., less than $44(H_d/H_b)^{(0.3\pm0.2)}$° C., less than $36(H_d/H_b)^{(0.3\pm0.2)}$° C., or less than $28(H_d/H_b)^{(0.3\pm0.2)}$° C.

The glass transition temperature of the damping layer can be selected to be low enough to impart the multilayer tape construction with sufficient damping performance at low temperatures. The damping layer glass transition temperature—as measured using oscillatory shear rheometry in the linear viscoelastic strain regime at a frequency of 10 rad/s using equipment such as the DHR-2 rheometer by TA Instruments—can, for example, range from −80° C. to 0° C., e.g., from −60° C. to −24° C., from −54° C. to −18° C., from −48° C. to −12° C., from −42° C. to −6° C., or from −36° C. to 0° C. In terms of upper limits, the damping layer glass transition temperature can be less than 0° C., e.g., less than −6° C., less than −12° C., less than −18° C., less than −24° C., less than −30° C., less than −36° C., less than −42° C., less than −48° C., or less than −54° C. In terms of lower limits, the damping layer glass transition temperature can be greater than −60° C., e.g., greater than −54° C., greater than −48° C., greater than −42° C., greater than −36° C., greater than −30° C., greater than −24° C., greater than −18° C., greater than −12° C., or greater than −6° C. Higher glass transition temperatures, e.g., greater than 0° C., and lower glass transition temperatures, e.g., less than −80° C., are also contemplated.

The glass transition temperature of the bonding layer can be selected to be high enough to impart the multilayer tape construction with sufficient adhesive performance. The bonding layer glass transition temperature can, for example, range from −50° C. to 100° C., e.g., from −45° C. to 70° C., from −35° C. to 46° C., from −21.5° C. to 59.5° C., from −8° C. to 73° C. from 5.5° C. to 86.5° C. or from 19° C. to 100° C. In terms of upper limits, the bonding layer glass transition temperature can be less than 100° C., e.g., less than 86.5° C., less than 73° C., less than 59.5° C., less than 46° C., less than 32.5° C., less than 19° C., less than 5.5° C., less than −8° C., or less than −21.5° C. In terms of lower limits, the bonding layer glass transition temperature can be greater than −35° C., e.g., greater than −21.5° C., greater than −8° C., greater than 5.5° C., greater than 19° C., greater than 32.5° C., greater than 46° C., greater than 59.5° C., greater than 73° C., or greater than 86.5° C. Higher glass transition temperatures, e.g., greater than 100° C., and lower glass transition temperatures, e.g., less than −50° C., are also contemplated.

Damping Layer and Bonding Layer Thicknesses

As discussed above, the relative difference between the glass transition temperatures of the damping layer and the bonding layer can be designed in part based on the relative thicknesses of these two layers of the multilayer tape construction. The ratio of the damping layer thickness to the bonding layer thickness can, for example, range from 0.1 to 20, e.g., from 0.1 to 17, from 0.1 to 15, from 0.1 to 13, from 0.1 to 10, from 0.1 to 8, from 0.1 to 5, from 0.1 to 3, from 0.1 to 1.6, from 0.16 to 2.5, from 0.25 to 4, from 0.4 to 6.3, or from 0.63 to 10. In terms of upper limits, the ratio of the damping layer thickness to the bonding layer thickness can be less than 10, e.g., less than 6.3, less than 4, less than 2.5, less than 1.6, less than 1, less than 0.63, less than 0.4, less than 0.25, or less than 0.16. In terms of lower limits, the ratio of the damping layer thickness to the bonding layer thickness can be greater than 0.1, e.g., greater than 0.16, greater than 0.25, greater than 0.4, greater than 0.63, greater than 1, greater than 1.6, greater than 2.5, greater than 4, or greater than 6.3. Higher ratios, e.g., greater than 20, and lower ratios, e.g., less than 0.1, are also contemplated.

The damping layer thickness and the bonding layer thickness can, for example, each independently range from 0.1 mil to 200 mil, e.g., from 0.1 mil to 10 mil, from 0.2 mil to 20 mil, from 0.5 mil to 40 mil, from 1 mil to 90 mil, or from 2 mil to 200 mil. In terms of upper limits, the damping layer and bonding layer thicknesses can each independently be less than 200 mil, e.g., less than 90 mil, less than 40 mil, less than 20 mil, less than 10 mil, less than 5 mil, less than 2 mil, less than 1 mil, less than 0.5 mil, or less than 0.2 mil. In terms of lower limits, the damping layer and bonding layer thicknesses can each independently be greater than 0.1 mil, e.g., greater than 0.2 mil, greater than 0.5 mil, greater than 1 mil, greater than 2 mil, greater than 5 mil, greater than 10 mil, greater than 20 mil, greater than 40 mil, or greater than 90 mil. Larger thicknesses, e.g., greater than 200 mil, and smaller thicknesses, e.g., less than 0.1 mil, are also contemplated.

Damping Layer and Bonding Layer Viscoelastic Loss Factors

To extract maximum shear strain and viscoelastic loss from the damping layer, this layer can be configured such that the minimum value of the damping layer viscoelastic loss factor scales with the damping layer thickness over a target operating range or over a target operating frequency. In particular, the damping layer can be configured such that $\tan(\delta)_d$ is equal to or greater than $(10^{-10} H_d^{-2.5}+0.25)$, where the damping layer thickness is expressed in terms of meters. While satisfying this condition, the damping layer viscoelastic loss factor can, for example, range from 0.5 to 4, e.g., from 1 to 2.8, from 1.3 to 3.1, from 1.6 to 3.4, from 1.9 to 3.7, or from 2.2 to 4. In terms of upper limits, the damping layer viscoelastic loss factor can be less than 4, e.g., less than 3.7, less than 3.4, less than 3.1, less than 2.8, less than 2.5, less than 2.2, less than 1.9, less than 1.6, or less than 1.3. In terms of lower limits, the damping layer viscoelastic loss factor can be greater than 1, e.g., greater than 1.3, greater than 1.6, greater than 1.9, greater than 2.2, greater than 2.5, greater than 2.8, greater than 3.1, greater than 3.4, or greater than 3.7. Larger viscoelastic loss factors, e.g., greater than 4, and smaller viscoelastic loss factors, e.g., less than 1, are also contemplated.

The desired temperature range of the multilayer tape construction application described herein, i.e., its target operating temperature range, can have a size that is, for example, greater than about 10° C., e.g., greater than 15° C., greater than 20° C., greater than 25° C., greater than 30° C., greater than 35° C., greater than 40° C., greater than 45° C., greater than 50° C., or greater than 55° C. The target operating temperature range of the multilayer tape construction can, for example, include temperatures between about −70° C. and about 20° C., e.g., between −40° C. and −20° C., between −30° C. and −10° C., between −20° C. and 0° C., between −10° C. and 10° C., or between 0° C. and 20° C. In terms of upper limits, the target operating temperature range can include temperatures below about 20° C., e.g., below 10° C., below 0° C., below −10° C., below −20° C., or below −30° C. In terms of lower limits, the target operating temperature range can include temperatures above about −60° C., e.g., above −30° C., above −20° C., above −10° C., above 0° C., or above 10° C.

The desired frequency range of the multilayer tape construction application described herein, i.e., its target operating frequency range, can have a size that is, for example, greater than about 100 Hz, e.g., greater than 135 Hz, greater than 170 Hz, greater than 205 Hz, greater than 240 Hz, greater than 275 Hz, greater than 310 Hz, greater than 345 Hz, greater than 380 Hz, or greater than 415 Hz. The target operating frequency range of the multilayer tape construction can, for example, include frequencies between 30 Hz and 2000 Hz, e.g., between 50 Hz and 1000 Hz, between 50 Hz and 500 Hz, between 50 Hz and 250 Hz, between 100 Hz and 300 Hz, between 150 Hz and 350 Hz, between 200 Hz and 400 Hz, between 250 Hz and 450 Hz, or between 300 Hz and 500 Hz. In terms of upper limits, the target operating frequency range can include frequencies below 500 Hz, e.g., below 450 Hz, below 400 Hz, below 350 Hz, below 300 Hz, below 250 Hz, below 200 Hz, below 150 Hz, or below 100 Hz. In terms of lower limits, the target operating frequency range can include frequencies above 50 Hz, e.g., above 100 Hz, above 150 Hz, above 200 Hz, above 250 Hz, above 300 Hz, above 350 Hz, above 400 Hz, or above 450 Hz.

While localization of the multilayer tape construction damping to the damping layer can be achieved at least in part by following the design constraints described above, those multilayer tapes that optionally include a stiff carrier layer can require an additional constraint based on the inherent damping capabilities of the viscoelastic layers, e.g., the maximum viscoelastic loss factors of both the damping layer and the bonding layer. For example, if a stiff carrier layer is required for certain applications, then the relative difference of the bonding layer viscoelastic loss factor and the damping layer viscoelastic loss factor can be maintained, along with the glass transition temperature difference between these layers, such that vibrational energies are not inadvertently absorbed by the bonding layer instead of the damping layer.

In some embodiments, the extensional stiffness per unit width of the optional carrier layer is sufficiently high that it is greater than one-third of the extensional stiffness per unit width of the substrate to which the multilayer tape construct will be applied. In mathematical notation, in this case $K_S/K_{CL}<3$. For some such embodiments, the difference between the glass transition temperatures of the bonding layer and the damping layer is greater than or equal to 25° C. In these cases, the damping layer and the bonding layer can be configured such that the damping layer viscoelastic loss factor peaks may be greater than the bonding layer viscoelastic loss factor, and the difference between the viscoelastic loss factors is greater than or equal to 2.

In other embodiments, the multitape construction may further comprise a carrier layer where the carrier layer extensional stiffness is greater than one-third of the substrate extensional stiffness, and the difference between the bonding layer glass transition temperature and the damping layer glass transition temperature is less than about 25° C. For some such embodiments, the ratio of the damping layer thickness to the bonding layer thickness is greater than or equal to 1. In these cases, the damping layer and the bonding layer can be configured such that the damping layer viscoelastic loss factor is greater than the bonding layer viscoelastic loss factor, and the difference between the viscoelastic loss factors is greater than or equal to 1.5. In other such embodiments, the ratio of the damping layer thickness to the bonding layer thickness is less than 1. In these cases, the damping layer and the bonding layer can be configured such that the damping layer viscoelastic loss factor is greater than the bonding layer viscoelastic loss factor, and the difference between the viscoelastic loss factors is greater than or equal to 2.

The bonding layer viscoelastic loss factor can, for example, range from 0.5 to 2.5, e.g., from 0.5 to 1.7, from 0.7 to 1.9, from 0.9 to 2.1, from 1.1 to 2.3, or from 1.3 to 2.5. In terms of upper limits, the damping layer viscoelastic loss factor can be less than 2.5, e.g., less than 2.3, less than 2.1, less than 1.9, less than 1.7, less than 1.5, less than 1.3, less than 1.1, less than 0.9, or less than 0.7. In terms of lower limits, the damping layer viscoelastic loss factor can be greater than 0.5, e.g., greater than 0.7, greater than 0.9, greater than 1.1, greater than 1.3, greater than 1.5, greater than 1.7, greater than 1.9, greater than 2.1, or greater than 2.3. Larger viscoelastic loss factors, e.g., greater than 2.5, and smaller viscoelastic loss factors, e.g., less than 0.5, are also contemplated.

The multilayer tape construction characteristics of the damping layer and bonding layer, as disclosed in above, may allow for localizing damping and adhesion to the damping layer and bonding layer respectively. Therefore, the design rules disclosed herein, may allow for designing any general vibration damping treatments (as shown in FIG. 1A-D, FIGS. 2A and 2B, and FIGS. 3A and 3B) where the damping and adhesion performance can be tuned independent of each other so long as the material characteristics are designed following the above design rules. The design rules disclosed herein can be used to develop vibration damping treatments with peak composite loss factor located at any temperature of interest ranging from −40° C. to 60° C., tunable adhesion with peel adhesion ranging from 10 N/25 mm to 50 N/25 mm, and shear adhesion failure temperature ranging from 80° C. to 250° C.

In many embodiments, the design rules described herein also describe the damping treatment consisting of the bonding layer directly disposed or at least partially disposed on the damping layer without a carrier layer. The rheological differentiators disclosed herein may allow for localization of damping and bonding to the damping layer and bonding layer respectively in either: 1) the absence of a carrier layer or other intermediary layer disposed between the damping layer and bonding layer, or 2) when the carrier layer or other intermediary layer is at least partially disposed between the damping layer and bonding layer.

Damping Performance Characteristics

An advantage of the multilayer tape constructions disclosed herein is that they are surprisingly capable of simultaneously providing both effective damping performance at low temperatures, e.g., temperatures below 0° C., and strong adhesion performance. For reasons discussed above, it is challenging for conventional damping constructions and methods to simultaneous provide these different performance characteristics under such temperature conditions.

One measure of the damping performance of the disclosed multilayer tape constructions is the temperature at which the composite loss factor exhibits it peak as measured at an operating frequency of 200 Hz. The composite loss factor can be determined as described in ASTM E 756-98 (2018). In general, the lower the temperature of the composite loss factor peak of a damping treatment is, the more effective the damping treatment may be at lower temperatures. For multilayer tape constructions meeting the design criteria described above, the 200-Hz composite loss factor peak can occur at a temperature of, for example, less than about 0° C., e.g., less than −4° C., less than −8° C., less than −12° C., less than −16° C., less than −20° C., less than −24° C., less than −28° C., less than −32° C., less than −36° C., or less than −40° C. The composite loss factor peak can occur at a temperature, for example, between 0° C. and −40° C., between −4° C. and −28° C., between −8° C. and −32° C., between −12° C. and −36° C., or between −16° C. and −40° C. Lower composite loss factor peak temperatures, e.g., less than −40° C., are also contemplated.

Another measure of the damping performance of the disclosed multilayer tape constructions is the width of the temperature range at which the composite loss factor is greater than 0.1 as measured at an operating frequency of 200 Hz. In general, the larger the composite loss factor width of a damping treatment is, the more effective the damping treatment is at temperatures higher or lower than those of the composite loss factor peak. The 200-Hz composite loss factor width of the multilayer tape construction can, for example, range from about 10° C. to about 60° C., e.g., from 10° C. to 40° C., from 15° C. to 45° C., from 20° C. to 50° C., from 25° C. to 55° C., or from 30° C. to 60° C. In terms of upper limits, the composite loss factor width can be less than 60° C., e.g., less than 55° C., less than 50° C., less than 45° C., less than 40° C., less than 35° C., less than 30° C., less than 25° C., less than 20° C., or less than 15° C. In terms of lower limits, the composite loss factor width can be greater than 10° C., e.g., greater than 15° C., greater than 20° C., greater than 25° C., greater than 30° C., greater than 35° C., greater than 40° C., greater than 45° C., greater than 50° C., or greater than 55° C. Larger composite loss factor widths, e.g., greater than 60° C., and smaller composite loss factor widths, e.g., less than 10° C., are also contemplated.

Adhesion Performance Characteristic

The multilayer tape constructions disclosed herein can exhibit significantly improved adhesion relative to that seen with conventional low temperature damping treatments. In particular, the provided tape constructions can have high adhesion performance as measured by both peel adhesion and shear adhesion tests. In some embodiments, improved adhesion may be seen with damping treatments with peak damping at even lower temperatures (e.g., temperatures below about 10° C.).

The peel adhesion strength of the multilayer tape construction described herein can be measured according to the standard protocol ASTM D3330 (2018) using a stainless steel substrate. The peel adhesion performance can, for example, range from about 10 N/25 mm to about 50 N/25 mm, e.g., from 10 N/25 mm to 34 N/25 mm, from 14 N/25 mm to 38 N/25 mm, from 18 N/25 mm to 42 N/25 mm, from 22 N/25 mm to 46 N/25 mm, or from 26 N/25 mm to 50 N/25 mm. In terms of upper limits, the peel adhesion performance can be less than 50 N/25 mm, e.g., less than 46 N/25 mm, less than 42 N/25 mm, less than 38 N/25 mm, less than 34 N/25 mm, less than 30 N/25 mm, less than 26 N/25 mm, less than 22 N/25 mm, less than 18 N/25 mm, or less than 14 N/25 mm. In terms of lower limits, the peel performance can be greater than 10 N/25 mm, e.g., greater than 14 N/25 mm, greater than 18 N/25 mm, greater than 22 N/25 mm, greater than 26 N/25 mm, greater than 30 N/25 mm, greater than 34 N/25 mm, greater than 38 N/25 mm, greater than 42 N/25 mm, or greater than 46 N/25 mm. Higher peel performances, e.g., greater than 50 N/25 mm, are also contemplated.

The shear adhesion fail temperature of the multilayer tape construction described herein can be measured according to the standard protocol ASTM D3654 (2015). The shear adhesion fail temperature of the tape can range, for example, from about 100° C. to about 250° C., e.g., from 100° C. to 190° C., from 115° C. to 205° C., from 130° C. to 220° C., from 145° C. to 235° C., or from 160° C. to 250° C. In terms of upper limits, the shear adhesion fail temperature can be less than 250° C., e.g., less than 235° C., less than 220° C., less than 205° C., less than 190° C., less than 175° C., less than 160° C., less than 145° C., less than 130° C., or less than 115° C. In terms of lower limits, the shear adhesion fail temperature can be greater than 100° C., e.g., greater than 115° C., greater than 130° C., greater than 145° C., greater than 160° C., greater than 175° C., greater than 190° C., greater than 205° C., greater than 220° C., or greater than 230° C. Higher shear adhesion fail temperatures, e.g., greater than 250° C., and lower shear adhesion fail temperatures, e.g., less than 100° C., are also contemplated.

The shear adhesion performance of the multilayer tape construction described herein can also be measured as a dynamic shear performance according to the standard protocol ASTM D3654. Additionally, ASTM D5656-10 (2017) may be used. The dynamic shear performance of the multilayer tape can, for example, range from about 350 N/625 mm$^2$ to about 600 N/625 mm$^2$, e.g., from 350 N/625 mm$^2$ to 500 N/625 mm$^2$, from 375 N/625 mm$^2$ to 525 N/625 mm$^2$, from 400 N/625 mm$^2$ to 550 N/625 mm$^2$, from 425 N/625 mm$^2$ to 575 N/625 mm$^2$, or from 450 N/625 mm$^2$ to 600 N/625 mm$^2$. In terms of upper limits, the low temperature dynamic shear performance can be less than 600 N/625 mm$^2$, e.g., less than 575 N/625 mm$^2$, less than 550 N/625 mm$^2$, less than 525 N/625 mm$^2$, less than 500 N/625 mm$^2$, less than 475 N/625 mm$^2$, less than 450 N/625 mm$^2$, less than 425 N/625 mm$^2$, less than 400 N/625 mm$^2$, or less than 375 N/625 mm$^2$. In terms of lower limits, the dynamic shear performance can be greater than 350 N/625 mm$^2$, e.g., greater than 375 N/625 mm$^2$, greater than 400 N/625 mm$^2$, greater than 425 N/625 mm$^2$, greater than 450 N/625 mm$^2$, greater than 475 N/625 mm$^2$, greater than 500 N/625 mm$^2$, greater than 525 N/625 mm$^2$, greater than 550 N/625 mm$^2$, or greater than 575 N/625 mm$^2$. Higher low temperature dynamic shear performances, e.g., greater than 600 N/625 mm$^2$, are also contemplated.

Damping Layer and Bonding Layer Materials

The viscoelastic materials of the damping layer and the bonding layer can include, for example and without limitation, rubber, plastic, e.g., nylon, leather, fabric, foam, sponge, gel, or the like. In some embodiments, each of the damping layer and the bonding layer includes one or more adhesives. The adhesives may be silicone adhesives, (meth)acrylic adhesives, rubber adhesives, polyisobutyl/butyl polymers, hybrid adhesives, and combinations thereof. In some embodiments, each damping layer and bonding layer includes one or more pressure sensitive adhesives. In some embodiments, the damping layer comprises a first pressure sensitive adhesive, and the bonding layer comprises a second pressure sensitive adhesive.

The damping layer and bonding layer materials can include one or more silicone adhesives. The silicone adhesives may comprise silicone monomer(s) including polyorganosiloxane dispersions or gums, such as polydimethylsiloxanes, polydimethyl/methylvinyl siloxanes, polydimethyl/methylphenyl siloxanes, polydimethyl/diphenyl siloxanes, and blends thereof. The silicone adhesives can include silicone resins, such as MQ resins or blends of resins. Non-limiting examples of such silicone adhesive compositions which are commercially available include adhesives 7651, 7652, 7657, Q2-7406, Q2-7566, Q2-7735 and 7956, all available from Dow Corning (Midland, MI); SILGRIP™ PSA518, 590, 595, 610, 915, 950 and 6574 available from Momentive Performance Materials (Waterford, NY); and KRT-009 and KRT-026 available from Shin-Etsu Silicone (Akron, OH).

In some embodiments, the damping layer and bonding layer materials comprise one or more silicone-based monomers selected from the group consisting of siloxanes, silane, and silatrane glycol. In some embodiments, the damping materials comprise one or more silicone-based monomers selected from the group consisting of 1,4-bis[dimethyl[2-(5-norbornen-2-yl)ethyl]silyl]benzene; 1,3-dicyclohexyl-1,1,3,3-tetrakis(dimethylsilyloxy)disiloxane; 1,3-dicyclohexyl-1,1,3,3-tetrakis(dimethylvinylsilyloxy)disiloxane; 1,3-dicyclohexyl-1,1,3,3-tetrakis[(norbornen-2-yl)ethyldimethylsilyloxy]disiloxane; 1,3-divinyltetramethyldisiloxane; 1,1,3,3,5,5-hexamethyl-1,5-bis[2-(5-norbornen-2-yl)ethyl]trisiloxane; 1,1,3,3-tetramethyl-1,3-bis[2-(5-norbornen-2-yl)ethyl]disiloxane; 2,4,6,8-tetramethyl-2,4,6,8-tetravinylcyclotetrasiloxane; N-[3-(trimethoxysilyl)propyl]-N'-(4-vinylbenzyl)ethylenediamine; and 3-[tris(trimethylsiloxy)silyl]propyl vinyl carbamate.

The damping layer and bonding layer materials can also include one or more (meth)acrylic adhesives comprising (meth)acrylic monomers. In some embodiments, the viscoelastic materials of the damping layer and bonding layer may comprise one or more (meth)acrylic-based monomers selected from the group consisting of methyl acrylate, ethyl acrylate, butyl acrylate, 2-ethylhexyl acrylate, isooctyl acrylate, isobornyl acrylate, isononyl acrylate, isodecyl acrylate, methylacrylate, methyl methacrylate, methylbutyl acrylate, 4-methyl-2-pentyl acrylate, butyl methacrylate, 2-ethylhexyl methacrylate, and isooctyl methacrylate. Useful alkyl acrylate esters include n-butyl acrylate, 2-ethyl hexyl acrylate, isooctyl acrylate. In one embodiment, the acrylic ester monomer is polymerized in the presence of a vinyl ester such as vinyl acetate, vinyl butyrate, vinyl propionate, vinyl isobutyrate, vinyl valerate, vinyl versitate, and the like. The vinyl ester can be present in a total amount of up to about 35 wt %, based on total weight of the monomers forming the acrylate main chain. In one embodiment, an acrylic ester monomer is copolymerized with an unsaturated carboxylic acid. The unsaturated carboxylic acid can include, among others, acrylic acid, methacrylic acid, itaconic acid, beta carboxy ethyl acrylate and the like.

The (meth)acrylic monomers may be polymerized to provide suitable acrylic polymers that include, but are not limited to, S2000N, S692N, AT20N, XPE 1043, and XPE 1045, all available from Avery Dennison (Glendale, CA); and H9232 available from BASF (Florham Park, NJ). In one embodiment, the acrylic polymer composition is blended with multiblock copolymers such as styreneisoprene-styrene (SIS), styrene-ethylenebutylene-styrene (SEBS) and the like in an amount of up to 30% by dry weight of the polymer. Examples of useful triblocks are available from Kraton Polymer Inc. (Houston, TX). Multiblock polymers can be useful in modifying the damping peak and other physical properties of the acrylic composition.

In some embodiments, the damping layer and bonding layer can comprise a rubber polymer. Rubber polymers may be comprised of combinations of styrene block copolymers and various tackifying resins, oils, fillers, pigments and antioxidants. A wide array of rubber polymer(s) can be used in the adhesives of the present subject matter tapes. Non-limiting examples of suitable rubber polymers and/or copolymers may include but are not limited to styrene-butadiene (SB), styrene-butadiene-styrene (SBS), styrene-isoprene (SI), styrene-isoprene-styrene (SIS), random styrene-butadiene (SBR), styrene-butadiene-isoprene multi-block (SBIBS), or polyisoprene. Fully and partially hydrogenated rubber agents can be used. Combinations of these agents can be used. Examples of suitable styrene-butadine-styrene (SBS) which are commercially available include KRATON D1101 and KRATON D1118 from Kraton Performance Polymers and VECTOR 2518D from Dexco Polymers. Examples of suitable styrene-isoprene-styrene (SIS) include KRATON D1107P and VECTOR 411A. An example of a suitable styrene-butadiene-isoprene multi-block (SBIBS) is KRATON S6455. Kraton GRP-6924 is an example of a hydrogenated styrene block copolymer. The styrene-butadiene copolymer(s) component of the adhesive compositions used in the present subject matter are typically block or multi-block copolymers having the general configuration: A-B-A or A-B-A-B-A-B- wherein the non-elastomeric polymer blocks A are styrene, while the elastomeric polymer blocks B are butadiene or butadiene which is partially or substantially hydrogenated. The polymeric blocks may be linear or branched. Typical branched structures contain an elastomeric portion with at least three branches which can radiate out from a central hub or can be otherwise coupled together. The damping layer and bonding layer can comprise a butyl rubber or polyisobutylene based pressure sensitive adhesive. These adhesives can be formulated from mixtures of various molecular weight butyl rubber or polyisobutylene polymers or oligomers. Non-limiting examples of butyl rubber grades useful for formulating these adhesives include Exxon Butyl 065, Butyl 365, Chlorobutyl 1065, Chlorobutyl 1055, Bromobutyl 2222 and Exxpro Specialty Elastomer 3433 from ExxonMobil Chemical and polyisobutylene grade Oppanol N50 from BASF. These polymers are often blended with a low molecular weight grade of polyisbutylene such as TPC 750, TPC 1600 or TPC 3500 from TPC Group. Additionally, these adhesive can be formulated with a wide variety of tackifying resins including C5-C9 hydrocarbon tackifiers as well as polyterpene resins. Suitable hydrocarbon tackifying resins include ESCOREZ 1310 and ESCOREZ 2101 available from ExxonMobil. Examples of polyterpene resins include Piccolyte A115 and Piccolyte S25 available from Pinova. In addition to the above listed components, butyl rubber and polyisobutylene based adhesives may also contain plasticizing oils, antioxidants, pigments and fillers. In the case of butyl and halo-butyl rubber based adhesives, curing agents may be added which allow for cross-linking. Examples of these cross-linkers are zinc oxide, phenol resins and others known in the art.

In some embodiments, a wide array of solid resin(s) can also be used. Nonlimiting examples of such include aliphatic hydrocarbons such as from C5 to C9, hydrogenated ester rosins, partially hydrogenated ester rosins, aromatic modified ester resins, pentaerythritol resins, hydrogenated pentaerythritol resins, terpene resins, glycerol ester rosin resins, pentaerythritol tall oil, terpene phenolics, glycerol ester rosin resin, and combinations thereof. Nonlimiting examples of suitable aliphatic hydrocarbons used as solid resin(s) include ESCOREZ 1310 and ESCOREZ 2101 available from Exxon Mobile. Examples of a suitable hydrogenated ester rosin is FORAL 85 available from several suppliers such as Eastman Chemical and HERCOLYN D from Pinova. An example of a suitable partially hydrogenated ester rosin is FORALYN from Eastman Chemical. An example of a suitable aromatic modified ester resin is PICCOTAC 7590 from Eastman Chemical. An example of a suitable pentaerythritol resin is PEXALYN 9100 from Pinova. An example of a suitable hydrogenated pentaerythritol resin is PENTALYN H from Eastman Chemical. An example of a suitable pentaerythritol tall oil resin is SYLVALITE RE 105L from Arizona Chemical. An example of a suitable terpene phenolic is PICCOLYTE A115 from Eastman Chemical. An example of a commercially available glycerol ester gum rosin resin is RESINALL 625 available from Resinall Corporation. A variety of liquid resin(s) can be used in the adhesive(s) of the present subject matter sealing tapes. The term "liquid resin" as used herein refers to any resin which is liquid at ambient temperature and which is compatible with the other components of the adhesive. A variety of liquid resin(s) can be used in the adhesives of the present subject matter sealing tapes. Nonlimiting examples of such liquid resin(s) include hydrogenated resin ester, terpene resins, low molecular weight hydrocarbons such as for example C5 hydrocarbons, and combinations thereof. An example of a suitable terpene resin is SYLVARES TR A25 available from Arizona Chemical. An example of a suitable C5 hydrocarbon is WINGTAC 10 available from numerous suppliers. An example of a suitable modified rosin resin for use in the adhesive(s) of the present subject matter sealing tapes is STAYBELITE-E ESTER 3-E which is an ester of hydrogenated rosin. STAYBELITE-E is available from Eastman Chemical.

A wide array of functional groups can be incorporated in a polymer of the damping layer and bonding layer materials. The functional groups can be incorporated into the polymer formed from the acrylic-based monomer or the silicon-based monomer, for example as end segments. Representative functional groups include, without limitation, hydroxy, epoxy, cyano, isocyanate, amino, aryloxy, aryalkoxy, oxime, aceto, epoxyether and vinyl ether, alkoxymethylol, cyclic ethers, thiols, benzophenone, acetophenone, acyl phosphine, thioxanthone, and derivatives of benzophenone, acetophenone, acyl phosphine, and thioxanthone.

Functional groups that have hydrogen-bonding capability are well known and include carboxyl, amide, hydroxyl, amino, pyridyl, oxy, carbamoyl and mixtures thereof. In some embodiments, an acrylic polymer backbone of the damping materials includes the polar comonomers vinyl pyrrolidone and acrylic acid. Examples of other monomers with hydrogen-bonding functionality include methacrylic acid, vinyl alcohol, caprolactone, ethylene oxide, ethylene glycol, propylene glycol, 2-hydroxyethyl acrylate, N-vinyl caprolactam, acetoacetoxyethyl methacrylate and others.

In some embodiments, the damping layer and bonding layer materials comprise one or more co-monomers bearing a functionality that can be further crosslinked. Examples of crosslinkable co-monomers include (meth) acrylic acid, 2-hydroxyethyl acrylate, glycidyl methacrylate, itaconic acid, allyl glycidyl ether and the like, and mixtures thereof. Functional moieties, such as those described above, can be used to crosslink polymer chains, to attach the high side chains to the backbone, or both.

The damping layer and bonding layer materials can further comprise a crosslinker, which can vary widely. Examples of suitable crosslinkers include multifunctional acrylates and methacrylates, such as diacrylates (ethylene glycol diacrylate, propylene glycol diacrylate, polyethylene glycol diacrylate, and hexanediol diacrylate), dimethacrylates (ethylene glycol diacrylate, diethylene glycol dimethacrylate, and 1,3 butane glycol dimethacrylate), triacrylates (trimethylolpropane trimethacrylate, ethoxylated trimethylolpropane triacrylate, and pentaerythritol triacrylate), and trimethacrylates (pentaerythritol trimethacrylate and trimethylolpropane trimethacrylate), as well as divinyl esters, such as divinylbenzene, divinyl succinate, divinyl adipate, divinyl maleate, divinyl oxalate, and divinyl malonate.

Additional crosslinkers present in the damping layer and bonding layer materials can serve to form crosslinks in a silicone-based matrix. In some embodiments, a peroxide crosslinker, such as dibenzoylperoxide, is suitable. In some embodiments, the crosslinker is a compound that contains silicon-hydride functionality. Non-limiting examples of such crosslinkers include PEROXAN BP 50W, PEROXAN BIC, and PEROXAN Bu, all available from Pergan (Bocholt, Germany); LUPEROX® A75 and A98 commercially available from Arkema (King of Prussia, PA); and PERKADOX® CH-50 and PD 50SPS from Akzo Nobel (Chicago, IL). Crosslinking can be facilitated and/or promoted by heating or other techniques generally depending upon the chemical system employed.

Other exemplary chemical crosslinkers that can be used in the damping layer and bonding layer materials include, but are not limited to, di-, tri- or poly-isocyanates with or without a catalyst (such as dibutyltin dilaureate); ionic crosslinkers; and di-, tri- or poly-functional aziridines. Illustrative, non-limiting examples of commercially available chemical crosslinkers include aluminum acetyl acetonate (AAA) available from NOAH Technologies (San Antonio, TX); TYZOR® available from DuPont (Wilmington, DE); XAMA® available from Bayer (Pittsburgh, PA); and PAPI™ and VORONATE™, available from Dow Chemical.

The damping layer and bonding layer materials can optionally comprise one or more tackifiers or resins, and these tackifiers (when employed) can vary widely. In some cases, the tackifier of the damping materials includes a single tackifier. In other cases, the tackifier comprises a mixture of multiple tackifier products. Suitable commercial tackifiers include (but are not limited to), for example, hydrogenated DCPD resins such as HD1100, HD1120 from Luhua (China), and E5400 from Exxon Mobil (Houston, TX). Other suitable hydrogenated resins include fully hydrogenated resins such as REGALITE™ S1100, R1090, R1100, C100R, and C100W from Eastman (Kingsport, TN); and fully hydrogenated C9 resins QM-100A and QM-115A from Hebei Qiming (China).

The damping layer and bonding layer materials can also optionally comprise one or more plasticizers, and these plasticizers (when employed) can vary widely. In some embodiments, the plasticizer has a high molecular weight and/or a high viscosity. In some cases, the plasticizer includes a single plasticizer. In other cases, the plasticizer comprises a mixture of multiple plasticizer products. Suitable commercial plasticizers include (but are not limited to), for example, KN 4010 and KP 6030 from Sinopec (Beijing, China); Claire F55 from Tianjin (China); F550 from Formosa Petrochemical (China), and various polyisobutene products.

The damping layer and bonding layer materials can optionally comprise one or more waxes, and these waxes (when employed) can vary widely. In some cases, the wax includes a single wax. In other cases, the wax comprises a mixture of multiple wax products. The wax can have a higher molecular weight so as to advantageously improve oil migration. Exemplary waxes include microcrystalline waxes, paraffin waxes, hydrocarbon waxes, and combinations thereof. Suitable commercial waxes include (but are not limited to), for example, Sasol wax 3971, 7835, 6403, 6805, and 1800 from Sasol (Houston, TX); A-C1702, A-C6702, A-C5180 from Honeywell (Morristown, NJ); and MICROWAX™ FG 7730 and MICROWAX™ FG 8113 from Paramelt (Muskegon, MI).

The damping layer and bonding layer materials can comprise one or more powder additives selected to improve damping performance across a broader range of operating temperatures. In some embodiments, the damping materials comprise one or more acrylic-based powder additives. Suitable commercially available acrylic-base powder additives include SPHEROMERS® CA 6, SPHEROMERS® CA 10, SPHEROMERS® CA 15, KRATON® SBS 1101 AS, KRATON® SB 1011 AC, KRATON® TM 1116 Polymer, KRATON® D1101 A Polymer, KRATON® D1114 P Polymer KRATON® D1114 P Polymer, Zeon NIPOL® 1052, Zeon NIPOL®1041, and Zeon NIPOL®NS 612. In some embodiments, the damping materials comprise one or more silicone-based powder additives. Suitable commercially available silicone-base powder additives include Shin-Etsu KMP 597, Shin-Etsu KMP 600, and Shin-Etsu KMP 701.

In some embodiments, the damping layer and bonding layer materials include one or more high surface area inorganic fillers or combinations of fillers and pigments such as carbon black, calcium carbonate, titanium dioxide, silica (hydrophilic and hydrophobic modified), mica, talc, kaolin, clay, diatomaceous earth, barium sulfate, aluminum sulfate, or mixtures of two or more thereof. Examples of commercially available high surface area inorganic fillers include those available from Evonik Degussa GmbH (Essen, Germany). Inorganic fillers including the foregoing examples can be used to modulate the damping and other physical properties of the damping patch. A wide variety of organic fillers could also or alternatively be used.

In another embodiment, a useful filler combination includes an anti-blocking agent which is chosen depending on the processing and/or use conditions. Examples of such agents include, for example, silica, talc, diatomaceous earth, and any mixtures thereof. The filler particles can be finely divided substantially water-insoluble inorganic filler particles.

The finely divided substantially water-insoluble inorganic filler particles can include particles of metal oxides. The metal oxide constituting the particles can be a simple metal oxide, i.e., the oxide of a single metal, or it can be a complex metal oxide, i.e., the oxide of two or more metals. The particles of metal oxide can be particles of a single metal oxide or they can be a mixture of different particles of different metal oxides. Examples of suitable metal oxides include alumina, silica, and titania. Other oxides can optionally be present in minor amount. Examples of such optional oxides include, but are not limited to, zirconia, hafnia, and yttria. Other metal oxides that can optionally be present are those that are ordinarily present as impurities such as for example, iron oxide. For purposes of the present specification and claims, silicon is considered to be a metal. When the particles are particles of alumina, most often the alumina is alumina monohydroxide. Particles of alumina monohydroxide, AlO(OH), and their preparation are known.

Metallic particulates can be used in the damping layer and bonding layer materials, for example, metal powders such as aluminum, copper or special steel, molybdenum disulfide, iron oxide, e.g., black iron oxide, antimony-doped titanium dioxide and nickel doped titanium dioxide. Metal alloy particulates can also be used.

Additives, such as carbon black and other pigments, ultraviolet light absorbers, ultraviolet stabilizers, antioxidants, fire retardant agents, thermally or electrically conductive agents, post curing agents, and the like can be blended into the damping layer and bonding layer materials. These additives can also include, for example, one or more inhibitors, defoamers, colorants, luminescents, buffer agents, antiblocking agents, wetting agents, matting agents, antistatic agents, acid scavengers, processing aids, extrusion aids, and others. Ultraviolet light absorbers include hydroxyphenyl benzotriazoles, and hydrobenzophenones. Antioxidants include, for example, hindered phenols, amines, and sulfur and phosphorus hydroxide decomposers, such as Irganox 1520L. The fillers, pigments, plasticizers, flame retardants, UV stabilizers, and the like are optional in many embodiments and can be used at concentrations of from 0 to 30% or more, such as up to 40% in particular embodiments. In certain embodiments, the total amount of fillers (inorganic and/or organic), pigments, plasticizers, flame retardants, UV stabilizers, and combinations thereof is from 0.1% to 30%, and more particularly from 1% to 20%.

The damping layer and bonding layer materials can also comprise one or more solvents. Nonlimiting examples of suitable solvents include toluene, xylene, tetrahydrofuran, hexane, heptane, cyclohexane, cyclohexanone, methylene chloride, isopropanol, ethanol, ethyl acetate, butyl acetate, isopropyl acetate, and combinations thereof. It will be appreciated that the present subject matter damping materials are not limited to such solvents and can utilize a wide array of other solvents, additives, and/or viscosity adjusting agents, such as reactive diluents.

Release Liners

In some embodiments, the multilayer tape construction also includes one or more release liners at least partially disposed on one or both of the major exterior faces of the tape. The release liners can function as a protective cover such that the release liners remain in place until the multilayer tape construction is ready for attachment to an object, surface, or substrate. If a liner or release liner is included in the tape, a wide array of materials and configurations can be used for the liner. In many embodiments, the liner is a paper or paper-based material. In many other embodiments, the liner is a polymeric film of one or more polymeric materials. Typically, at least one face of the liner is at least partially coated with a release material such as a silicone or silicone-based material. As will be appreciated, the release coated face of the liner is placed in contact with the otherwise exposed face of an outer bonding layer. Prior to application of the label to a surface of interest, the liner is removed to thereby expose the bonding layer of the tape. The liner can be in the form of a single sheet. Alternatively, the liner can be in the form of multiple sections or panels.

Constraining Layers

In some embodiments, the multilayer tape construction also includes one or more constraining layers, for example at least partially disposed on one of the major exterior faces of the tape. In other embodiments, at least a portion of the damping layer is at least partially disposed between the carrier layer and the constraining layer. The constraining layer materials can include one or more polymeric materials. Nonlimiting examples of polymeric materials include polyvinyl chloride (PVC), polyolefins such as polyethylene (PE) and/or polypropylene (PP), polyethylene terephthalate (PET), polycarbonate (PC), polystyrene (PS), and combinations of these and other materials.

The constraining layer materials can include one or more metals or metal alloys. Nonlimiting examples of metals include aluminum, steel, magnesium, bronze, copper, brass, titanium, iron, beryllium, molybdenum, tungsten, or osmium. In some embodiments, the constraining layer is a metal foil. Generally, any metal foil can be used, including ferrous and nonferrous based foils. A wide array of metals can be used such as, but not limited to, Aluminum, Copper, Tin, Brass, Gold, Silver, Nickel, Steel, Stainless Steel, mixtures and/or alloys of these with other metals and/or agents. In many embodiments, an Aluminum foil is used. However, it is contemplated that other metals and/or combinations of metals may be used including Columbium/Niobium, Hafnium, Iridium, Molybdenum and alloys, Rhenium and alloys, Tantalum, Tungsten and alloys, Platinum, Platinum and Iridium, Alloy 42 and 52, Hastelloy, Inconel, Invar 36®, Kovar®, Monel, Nichrome/Tophet "A," Phosphor Bronze, Titanium, Vanadium, Zirconium, and combinations thereof. The present subject matter may include the use of coated metal foils and metal foils comprising one or more metals in combination with one or more agents. It is also contemplated that instead of, or in addition to, one or more metal foils for a substrate of the viscoelastic damping material laminate, one or more polymeric films or coatings could be utilized. In one embodiment, the metal foil may comprise metalized film.

The present subject matter also may comprise other materials for the constraining layer such as heterogeneous layers or regions. In some embodiments, the constraining layer may comprise one or more adjuvants dispersed in a matrix material. The adjuvants may, for example, be in the form of particles, platelets, fibers, geometrically shaped materials, and/or sheet-like regions of a first material different in chemical composition from the matrix material. A particular example of a heterogeneous layer is a carbon fiber film. In another embodiment, a heterogeneous layer may comprise a polymer composite with at least one layer of fiberglass or carbon fiber. In one example, the fiberglass may be impregnated with epoxy. In another example, the fiberglass may be FR-4 (also known as FR4). In some embodiments, the selection of the adjuvant(s) and of the matrix material and extent of dispersal of the adjuvant(s) within the matrix material enables specific tailoring of the physical properties and characteristics of the heterogeneous layer(s) which may be used as substrate(s). In still other embodiments, the substrate(s) can utilize foils that exhibit compositional gradients or regions such as along the foil thickness. In some embodiments, compositional gradients or regions may provide a gradual change in material properties from one surface to another surface. The metal foil may be a differential foil having a first ferrous region of ferrous foil and a second region of a non-ferrous based foil. In some embodiments, a differential foil could be used having two or more regions of a ferrous composition or ferrous-based composition, in combination with two or more regions of a nonferrous composition or nonferrous-based composition.

The constraining layer materials can include one or more natural or manufactured woods. The constraining layer materials can include one or more fibers. Nonlimiting examples of fibers include hemp fibers, flax fibers, glass fibers, and carbon fibers. The constraining layer materials can include one or more carbon based materials, including carbon nanotubes, graphene, diamond, carbine, or combinations thereof. Composite materials and combinations of these materials could also be used.

Configurations

The multilayer tape constructions can include a single damping layer and a single bonding layer. In some embodiments, the multilayer tape constructions with a single damping layer and a single bonding layer may further comprise a single carrier layer. In many embodiments. In other embodiments, the multilayer tapes can include at least one additional damping layer. In still other embodiments, the multilayer tapes can include at least one additional bonding layers. In yet other embodiments, the multilayer tapes can include at least one additional carrier layers. In other embodiments, the multilayer tapes can include two or more damping layers and two or more bonding layers. In some embodiments, the multilayer tape constructions with two or more damping layers and two or more bonding layers may further comprise two or more carrier layers. In general, each carrier layer of the tape is at least partially disposed between one of the bonding layers and one of the damping layers. In some embodiments, the carrier layer is at least partially laminated directly to each of the bonding layer and the damping layer that it is at least partially disposed between. To improve the efficiency and robustness of the multilayer tape laminate, delamination and intra-tape adhesion failure should be minimized. In some embodiments, the carrier layer is primer coated and at least partially coating with a coupling agent to increase anchorage to the layers directly adjacent to the carrier layer. The carrier layer can also be corona treated to promote adhesion to the bonding and damping layers.

Figure 1B:
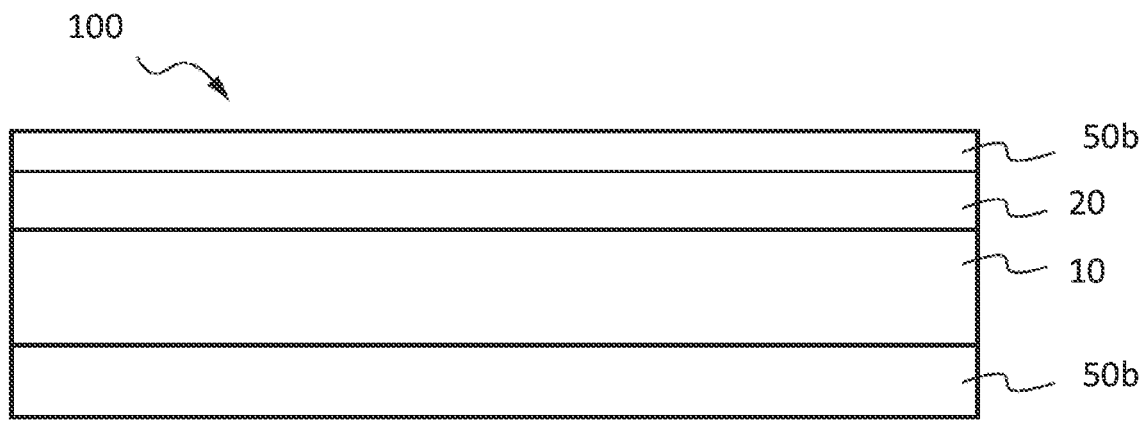
FIG. 1B illustrates the multi-layer tape construction of FIG. 1A in use in a constrained layer damping setting between two substrates.

FIG. 1A illustrates an exemplary multilayer tape 100 construction intended for use in a constrained layer damping setting. The multilayer tape 100 includes a damping layer 10 (also referred to herein as a viscoelastic damping material (VDM) layer 10) positioned with a bonding layer 20 (also referred to herein as a viscoelastic bonding layer (VBL) 20). The damping layer 10 and the bonding layer 20 are at least partially disposed on each other. Optionally, a pair of release liners (RL) 40a and 40b are at least partially disposed at either end of the tape, adjacent to each of the bonding layers. FIG. 1B illustrates the tape of FIG. 1A after application between two substrates 50a and 50b. In this configuration, the tape may be used as a transfer tape in a constrained layer damping setting. For FIGS. 1A and 1B, the thicknesses of the layers may vary and are not limited to those relative thicknesses shown in these figures.

Figure 1C:
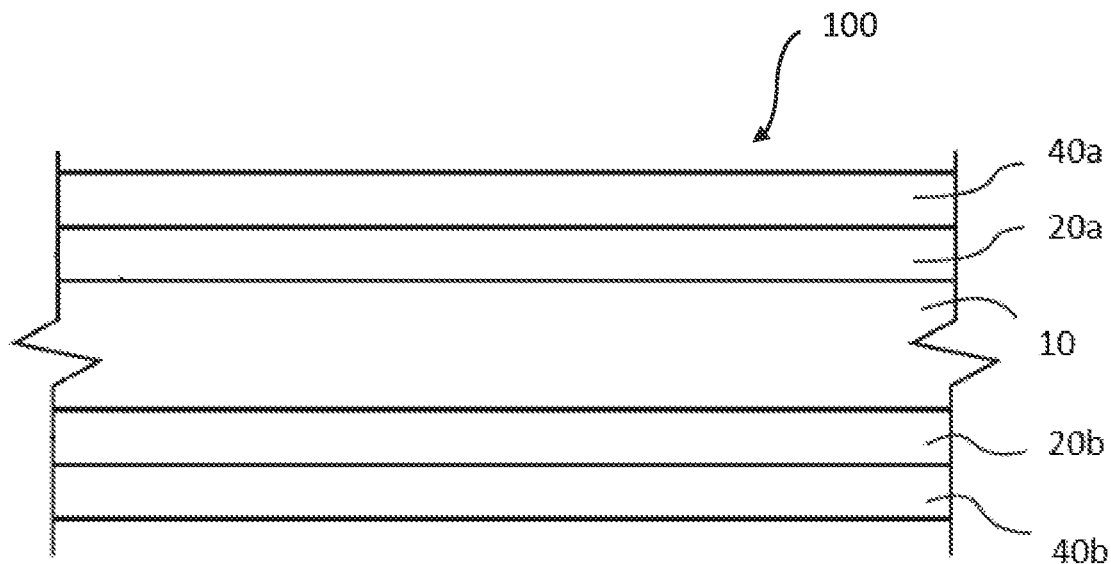
FIG. 1C illustrates an exemplary configuration of the multi-layer tape construction as disclosed herein.
Figure 1D:
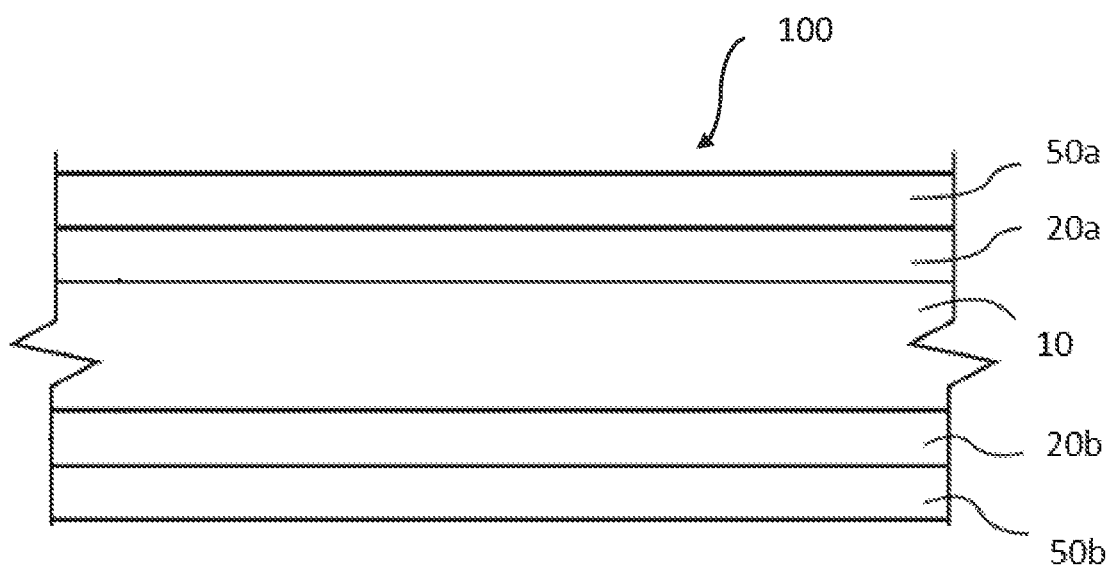
FIG. 1D illustrates the multi-layer tape construction of FIG. 1C in use in a constrained layer damping setting between two substrates.

FIG. 1C illustrates an exemplary multilayer tape 100 construction intended for use in a constrained layer damping setting. The multilayer tape 100 includes a damping layer 10 (also referred to herein as a viscoelastic damping material (VDM) layer 10) centrally positioned between two bonding layers 20a and 20b (also referred to herein as viscoelastic bonding layers (VBL) 20a and 20b). Optionally, a pair of release liners (RL) 40a and 40b are at least partially disposed at either end of the tape, adjacent to each of the bonding layers. FIG. 1D illustrates the tape of FIG. 1C after application between two substrates 50a and 50b. In this configuration, the tape may be used as a transfer tape in a constrained layer damping setting. For FIGS. 1C and 1D, the thicknesses of the layers may vary and are not limited to those relative thicknesses shown in these figures.

Figure 2A:
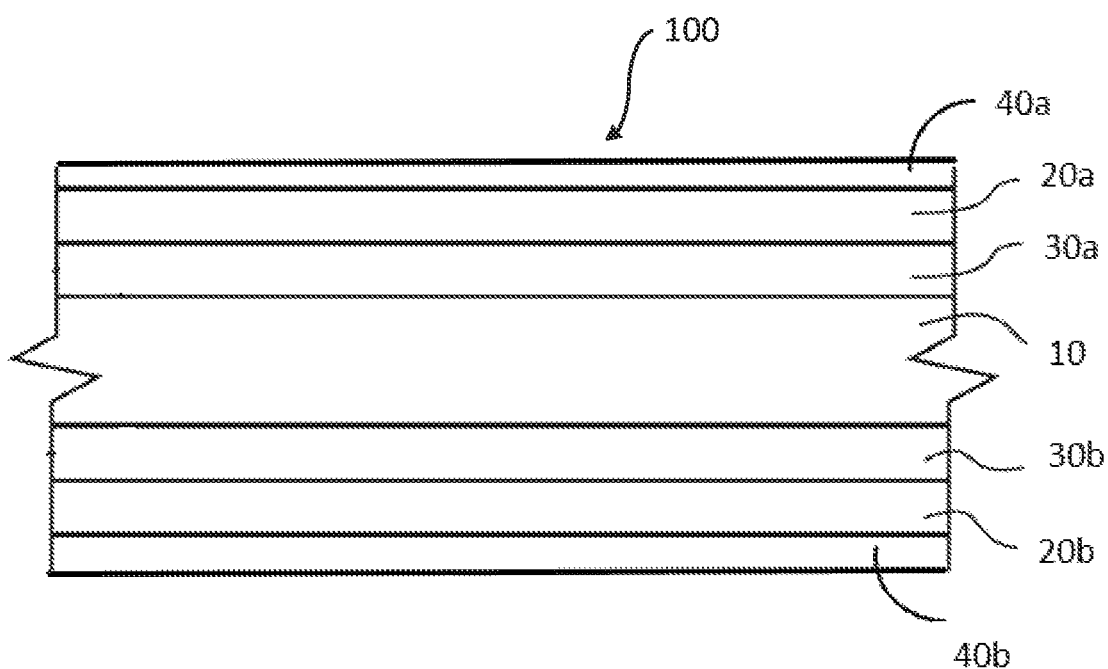
FIG. 2A illustrates an exemplary configuration of the multi-layer tape construction as disclosed herein.
Figure 2B:
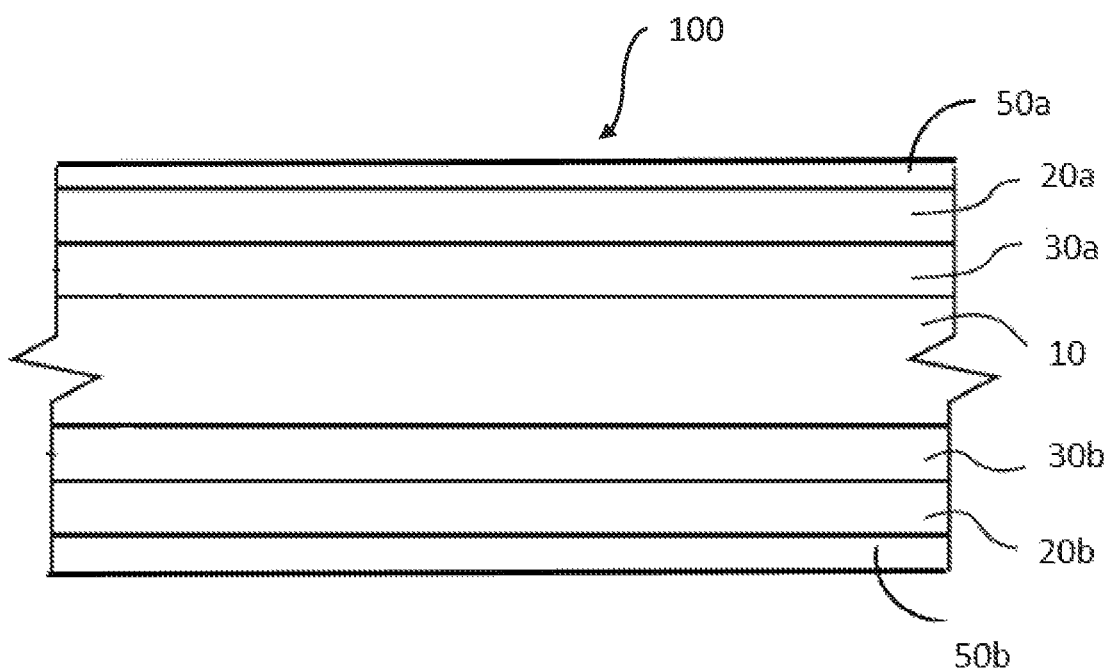
FIG. 2B illustrates the multi-layer tape construction of FIG. 2A in use in a constrained layer damping setting between two substrates.

FIG. 2A illustrates an exemplary multilayer tape 100 construction intended for use in a constrained layer damping setting between two vibrating substrates. The tape includes a damping layer 10 (also referred to herein as a viscoelastic damping material (VDM) layer 10) centrally positioned between two bonding layers 20a and 20b (also referred to herein as two viscoelastic bonding layers (VBL) 20a and 20b). Between each of the bonding layers 20a and 20b and the damping layer is one of two optional carrier layers (CL) 30a and 30b. Optionally, a pair of release liners (RL) 40a and 40b are at least partially disposed at either end of the tape, adjacent to each of the bonding layers. FIG. 2B illustrates the tape of FIG. 2A after application between two substrates 50a and 50b. In this configuration, the multilayer tape 100 is used as a transfer tape in a constrained layer damping setting. For FIGS. 2A and 2B, the thicknesses of the layers may vary and are not limited to those relative thicknesses shown in these figures.

Figure 3A:
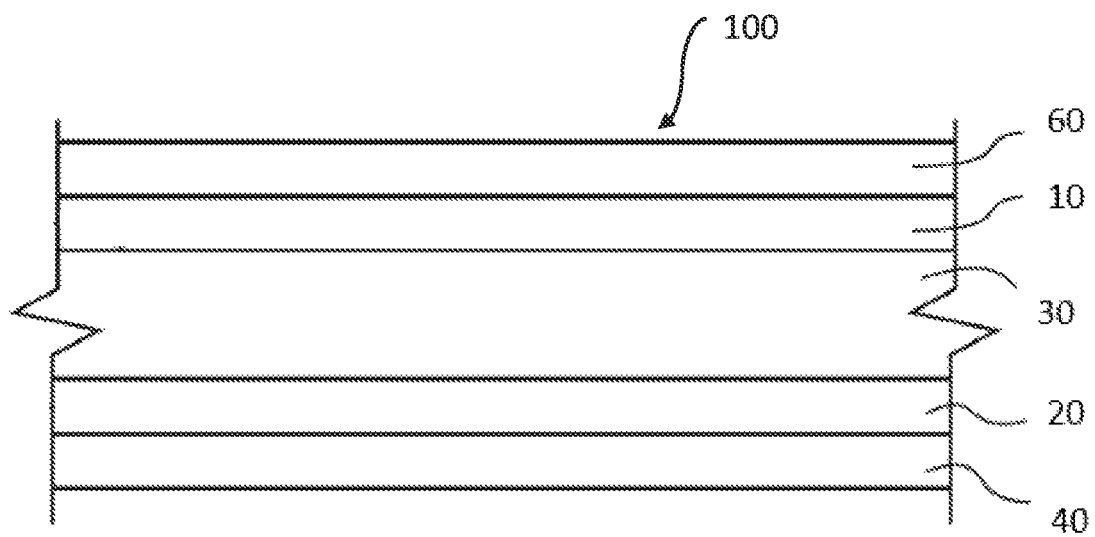
FIG. 3A illustrates an exemplary configuration of a peel-and-stick constrained layer damping multilayer tape construction as disclosed herein.
Figure 3B:
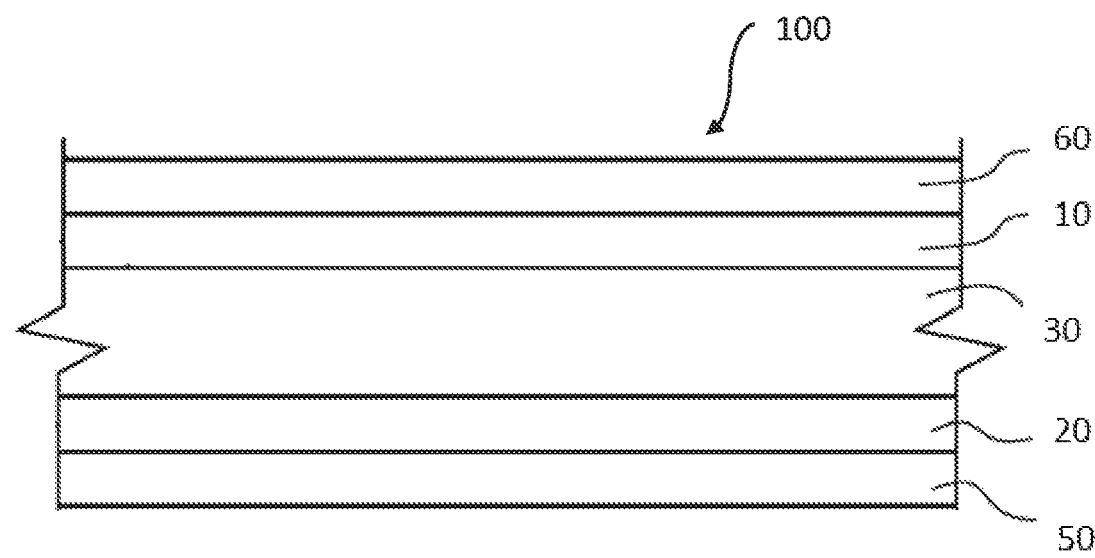
FIG. 3B illustrates the constrained layer damping multilayer tape construction of FIG. 3A in use applied to a substrate.

FIG. 3A illustrates an exemplary multilayer tape 100 construction intended for use with a single vibrating substrate. The tape includes a damping layer 10 (also referred to herein as a viscoelastic damping material (VDM) layer 10) at least partially disposed between a bonding layer 20 (also referred to herein as viscoelastic bonding layer (VBL) 20) and a constraining layer 20. In this particular embodiment, an optional carrier layer (CL) 30 is between and directly adjacent to the bonding layer 20 and one face of the damping layer 10. The constraining layer 60 is directly adjacent to the opposite face of the damping layer 10. Optionally, a release liner 40 is at least partially disposed at the end of the tape opposite the constraining layer 60, adjacent to the otherwise exposed face of the bonding layer 20. FIG. 3B illustrates the tape of FIG. 3A after application to a substrate 50. In this configuration, the tape is a peel-and-stick CLD tape. For FIGS. 3A and 3B, the thicknesses of the layers may vary and are not limited to those relative thicknesses shown in these figures.

The following embodiments are contemplated. All combinations of features and embodiments are contemplated.

Embodiment 1: A multilayer tape construction comprising: a damping layer having a damping layer glass transition temperature ($T_{g,d}$), a damping layer thickness ($H_d$), and a damping layer viscoelastic loss factor ($\tan(\delta)_d$); and a bonding layer having a bonding layer glass transition temperature ($T_{g,b}$), a bonding layer thickness ($H_b$), and a bonding layer viscoelastic loss factor ($\tan(\delta)_b$), wherein $T_{g,b}$ is greater than or equal to $T_{g,d}$.

Embodiment 2: An embodiment of embodiment 1, having a 200-Hz composite loss factor peak at a temperature less than 0° C.

Embodiment 3: An embodiment of embodiment 1 or 2, having a peel adhesion greater than 10 N/25 mm.

Embodiment 4: An embodiment of any of the embodiments of embodiment 1-3, having shear adhesion fail temperature greater than 115° C.

Embodiment 5: An embodiment of embodiment 1, having a shear adhesion fail temperature greater than 100° C., a 200-Hz composite loss factor width greater than 40° C., and a 200-Hz composite loss factor peak at a temperature less than −5° C.

Embodiment 6: An embodiment of embodiment 1, having a peel adhesion greater than 10 N/25 mm, a dynamic shear greater than 375 N/625 mm$^2$, and a 200-Hz composite loss factor peak at a temperature less than −5° C.

Embodiment 7: An embodiment of embodiment 1, having a peel adhesion greater than 10 N/25 mm, a dynamic shear greater than 75 N/625 mm$^2$, and a 200-Hz composite loss factor peak at a temperature less than −15° C.

Embodiment 8: An embodiment of any of the embodiments of embodiment 1-7, wherein ($T_{g,b}-T_{g,d}$) is less than $(80\pm40)(H_d/H_b)^{(0.6\pm0.2)}$° C.

Embodiment 9: An embodiment of any of the embodiments of embodiment 1-7, wherein ($T_{g,b}-T_{g,d}$) is less than $(60\pm40)(H_d/H_b)^{(0.3\pm0.2)}$° C.

Embodiment 10: An embodiment of any of the embodiments of embodiment 1-9, wherein $T_{g,b}$ ranges from −35° C. to 100° C.

Embodiment 11: An embodiment of any of the embodiments of embodiment 1-10, wherein $T_{g,d}$ ranges from −80° C. to 10° C.

Embodiment 12: An embodiment of any of the embodiments of embodiment 1-11, wherein $H_d$ ranges from 0.1 mil to 200 mil.

Embodiment 13: An embodiment of any of the embodiments of embodiment 1-12, wherein $H_b$ ranges from 0.1 mil to 200 mil.

Embodiment 14: An embodiment of any of the embodiments of embodiment 1-13, wherein $\tan(\delta)_d$ is equal to or greater than $(10^{-10} H_d^{-2.5}+0.25)$ as measured over a target operating temperature range or over a target operating frequency range.

Embodiment 15: An embodiment of embodiment 14, wherein the target operating temperature range is greater than 30° C.

Embodiment 16: An embodiment of embodiment 15, wherein the target operating temperature range includes temperatures between −40° C. and 0° C.

Embodiment 17: An embodiment of any of the embodiments of embodiment 14-16, wherein the target operating frequency range is greater than 240 Hz.

Embodiment 18: An embodiment of embodiment 17, wherein the target operating frequency range includes frequencies between 100 Hz and 2000 Hz.

Embodiment 19: An embodiment of any of the embodiments of embodiment 1-18, wherein $\tan(\delta)_d$ ranges from 1 to 4.

Embodiment 20: An embodiment of any of the embodiments of embodiment 1-19, wherein $T_{g,b}$ is at least 25° C. greater than $T_{g,d}$, and wherein $\tan(\delta)_d$ is at least 2 greater than $\tan(\delta)_b$.

Embodiment 21: An embodiment of any of the embodiments of embodiment 1-19, wherein $T_{g,b}$ is less than 25° C. greater than $T_{g,d}$, wherein $H_d$ is greater than or equal to $H_b$, and wherein $\tan(\delta)_d$ is at least 1.5 greater than $\tan(\delta)_b$.

Embodiment 22: An embodiment of any of the embodiments of embodiment 1-19, wherein $T_{g,b}$ is less than 25° C. greater than $T_{g,d}$, wherein $H_d$ is less than $H_b$, and wherein $\tan(\delta)_d$ is at least 2 greater than $\tan(\delta)_b$.

Embodiment 23: An embodiment of any of the embodiments of embodiment 1-22, wherein $\tan(\delta)_b$ ranges from 0.5 to 2.5.

Embodiment 24: An embodiment of any of the embodiments of embodiment 1-23, further comprising a carrier layer, at least a portion of which is disposed between the damping layer and the bonding layer.

Embodiment 25: An embodiment of any of the embodiments of embodiment 1-24, wherein at least a portion of the damping layer is in direct contact with at least a portion of the carrier layer.

Embodiment 26: An embodiment of embodiment 25, wherein the portion of the carrier layer in direct contact with the portion of the damping layer is at least partially coated with one or more coupling agents.

Embodiment 27: An embodiment of any of the embodiments of embodiment 25 or 26, wherein the portion of the carrier layer in direct contact with the portion of the damping layer is corona treated.

Embodiment 28: An embodiment of any of the embodiments of embodiment 24-27, wherein the carrier layer is a first carrier layer, and wherein the multilayer tape construction further comprises at least one additional carrier layer.

Embodiment 29: An embodiment of any of the embodiments of embodiment 1-28, further comprising: a constraining layer.

Embodiment 30: An embodiment of any of the embodiments of embodiment 1-29, wherein the multilayer tape construction further comprises at least one additional bonding layer.

Embodiment 31: An embodiment of any of the embodiments of embodiment 1-30, wherein the multilayer tape construction further comprises at least one additional damping layer.

Embodiment 32: An embodiment of any one of embodiments 24-31 further comprising at least one additional carrier layer.

Embodiment 33: An embodiment of embodiment 32 wherein at least a portion of an additional carrier layer is at least partially disposed between the damping layer and an additional bonding layer.

Embodiment 34: An embodiment of embodiment 32, wherein the carrier layer is a first carrier layer, and the first carrier layer and/or at least one additional carrier layer has an extensional stiffness ($K_{CL}$), wherein $K_S/K_{CL}$ is greater than or equal to 3.

Embodiment 35: An embodiment of any of embodiments 1-34, further comprising a first release liner.

Embodiment 36: An embodiment of embodiment 35, wherein at least a portion of the first bonding layer is at least partially disposed on the first release liner.

Embodiment 37: An embodiment of embodiment 35, further comprising a second release liner.

Embodiment 38: An embodiment of embodiment 37, wherein at least a portion of the additional bonding layer is at least partially disposed on the second release liner.

Embodiment 39: A system comprising: a base substrate having a substrate extensional stiffness ($K_S$); and a multilayer tape construction described herein.

Embodiment 40: A system comprising: a base substrate having a substrate extensional stiffness ($K_S$); and a multilayer tape construction comprising a damping layer having a damping layer glass transition temperature (Tg,d) and a damping layer thickness (Hd); and a bonding layer having a bonding layer glass transition temperature (Tg,b) and a bonding layer thickness (Hb), wherein $(T_{g,b}-T_{g,d})$ is less than $(80\pm40)(H_d/H_b)^{(0.6\pm0.2)}$° C.

Embodiment 41: An embodiment of embodiment 40, wherein the damping layer has a damping layer viscoelastic loss factor ($\tan(\delta)_d$), and wherein $\tan(\delta)_d$ is equal to or greater than $(10^{-10}H_d^{-2.5}+0.25)$ as measured over a target operating temperature range or over a target operating frequency range.

Embodiment 42: An embodiment of any of the embodiments of embodiment 41, wherein the target operating temperature range is greater than 30° C.

Embodiment 43: An embodiment of embodiment 41, wherein the target operating temperature range includes temperatures between −20° C. and 0° C.

Embodiment 44: An embodiment of any of the embodiments of embodiment 41-43, wherein the target operating frequency range is greater than 250 Hz.

Embodiment 45: An embodiment of any of the embodiments of embodiment 41-43, wherein the target operating frequency range includes frequencies between 100 Hz and 2000 Hz.

Embodiment 46: An embodiment of any of the embodiments of embodiment 40-45, further comprising a carrier layer having a carrier layer extensional stiffness ($K_{CL}$), wherein $K_S/K_{CL}$ is greater than or equal to 3, and wherein at least a portion of the carrier layer is at least partially disposed between the damping layer and the bonding layer Embodiment 47: A system comprising: a base substrate having a substrate extensional stiffness ($K_S$); and a multilayer tape construction comprising a damping layer having a damping layer glass transition temperature ($T_{g,d}$), a damping layer viscoelastic loss factor ($\tan(\delta)_d$), and a damping layer thickness ($H_d$); and a bonding layer having a bonding layer glass transition temperature ($T_{g,b}$), a bonding layer viscoelastic loss factor ($\tan(\delta)_b$), and a bonding layer thickness ($H_b$), wherein $(T_{g,b}-T_{g,d})$ is less than $(60\pm40)(H_d/H_b)^{(0.3\pm0.2)}$° C.

Embodiment 48: An embodiment of embodiment 47, wherein $\tan(\delta)_d$ is equal to or greater than $(10^{-10}H_d^{-2.5}+$ 0.25) as measured over a target operating temperature range or over a target operating frequency range.

Embodiment 49: An embodiment of embodiment 48, wherein the target operating temperature range is greater than 30° C.

Embodiment 50: An embodiment of embodiment 49, wherein the target operating temperature range includes temperatures between −40° C. and 0° C.

Embodiment 51: An embodiment of any of the embodiments of embodiment 47-50, wherein the target operating frequency range is greater than 250 Hz.

Embodiment 52: An embodiment of any of the embodiments of embodiment 47-50, wherein the target operating frequency range includes frequencies between 100 Hz and 2000 Hz.

Embodiment 53: An embodiment of any of the embodiments of embodiment 47-52, wherein $T_{g,b}$ is at least 25° C. greater than $T_{g,d}$, and wherein $\tan(\delta)_d$ is at least 2 greater than $\tan(\delta)_b$.

Embodiment 54: An embodiment of any of the embodiments of embodiment 47-52, wherein $T_{g,b}$ is less than 25° C. greater than $T_{g,d}$, wherein $H_d$ is greater than or equal to $H_b$, and wherein $\tan(\delta)_d$ is at least 1.5 greater than $\tan(\delta)_b$.

Embodiment 55: An embodiment of any of the embodiments of embodiment 47-52, wherein $T_{g,b}$ is less than 25° C. greater than $T_{g,d}$, wherein $H_d$ is less than $H_b$, and wherein $\tan(\delta)_d$ is at least 2 greater than $\tan(\delta)_b$.

Embodiment 56: An embodiment of any of the embodiments of embodiment 47-55, further comprising a carrier layer having a carrier layer extensional stiffness ($K_{CL}$), wherein $K_S/K_{CL}$ is less than 3, and wherein at least a portion of the carrier layer is disposed between the damping layer and the bonding layer.

Embodiment 57: A method of reducing a vibration to a base substrate, the method comprising: providing a base substrate that is subject to a vibration; and connecting the bonding layer of the multilayer tape construction of any of the embodiments of embodiment 1-38 to the base substrate, thereby reducing the vibration of the base structure.

Embodiment 58: An embodiment of embodiment 57, wherein the vibration of the base structure is dissipated at a temperature less than 10° C.

The present disclosure will be better understood in view of the following non-limiting examples.

EXAMPLES

In each of the examples below, the damping performance of the multilayer tape construction is measured in terms of the composite loss factor (CLF) following ASTM E-756 (2017) or SAE J-1637 (1993). For multilayer tapes configured as in FIG. 1A, FIG. 1C, and FIG. 2A, the CLF is measured using a sandwich beam construction, and for multilayer tapes configured as in FIG. 3A, CLF is measured on an Oberst beam construction. Stainless steel beams with thicknesses of 0.75 mm were used in both cases. Results are reported at a reference frequency of 200 Hz. The width of CLF is measured for CLF≥0.1. The rheological properties of the damping layers and bonding layers were measured by oscillatory shear rheology at an applied strain of 0.1% at a frequency of 10 rad/s using the DHR-2 rheometer manufactured by TA Instruments.

Figure 4:
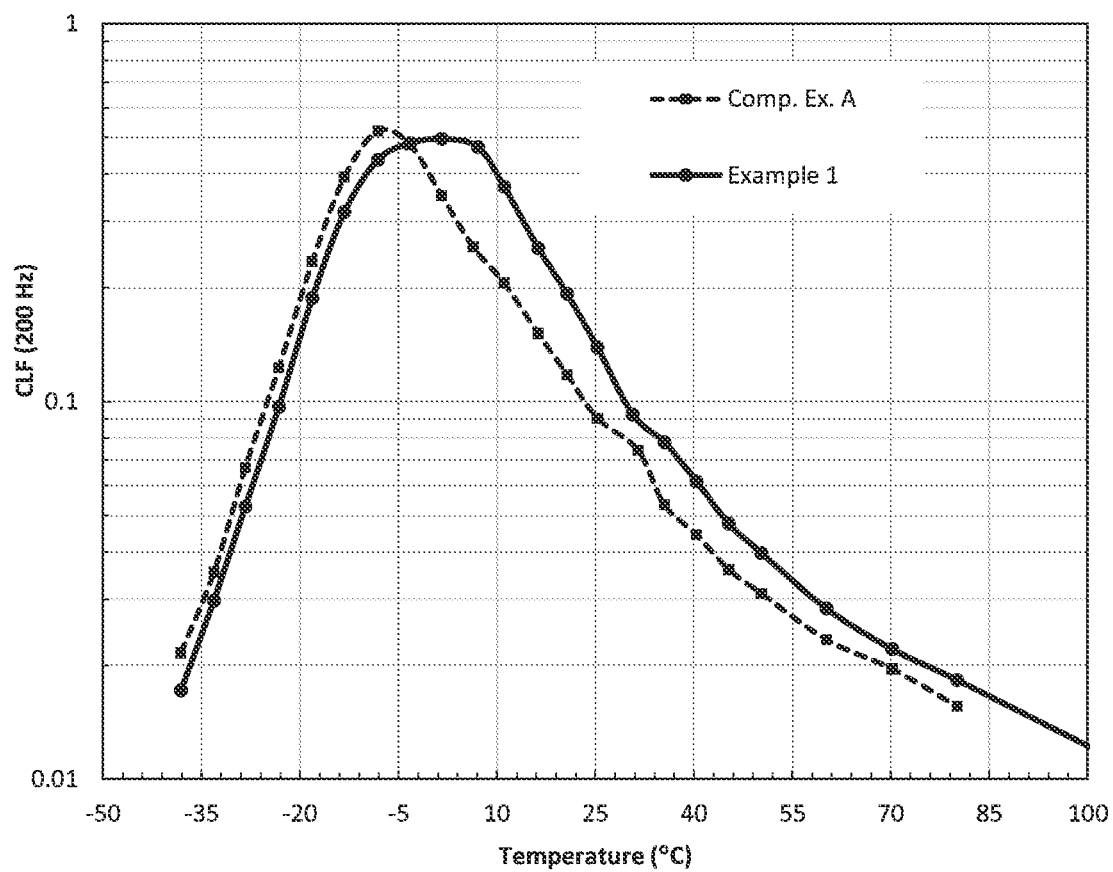
FIG. 4 is a graph of composite loss factors of a comparative damping tape and an exemplary multilayer tape construction as disclosed herein.

Comparative Example A includes a 5-mil moderately cross-linked acrylic copolymer with Tg,d=−30° C. as a damping layer, and does not include a bonding layer or a carrier layer. Example 1 is a multilayer tape construction as disclosed herein and arranged as in FIG. 2A. The Example 1 tape includes a 2-mil PET layer as a carrier layer, Avery Dennison's High Performance Acrylic transfer tape, HPA™ 1902 a bonding layer with Tg,b=−17° C., and the same damping layer as Comparative Example A. From the data of FIG. 4 and Table 1 below, it can be seen that both Comparative Example A and Example 1 achieve nearly identical peak CLF values. While the temperature at peak CLF for Example 1 (−6° C.) is only slightly higher than that for Comparative Example A (−8° C.), the CLF width for Example 1 is significantly broader than that of Comparative Example A, allowing the Example 1 multilayer tape to achieving an overall better low-temperature damping performance relative to that of Comparative Example A.

Other advantages of the Example 1 multilayer tape having differentiated layer rheology can be seen in the adhesion performance of Example 1 when compared to that of Comparative Example A. From Table 1, the Comparative Example 1 tape achieves good 180° peel adhesion and dynamic shear, however exhibits compromised shear adhesion failure temperature (SAFT) performance. In contrast, the Example 1 multilayer tape achieves good peel, dynamic shear, and SAFT performance, in conjunction with the aforementioned good low-temperature damping performance. These results demonstrate that, by localizing the damping and adhesion properties of the multilayer tape construction to a damping layer and bonding layer, respectively, excellent low-temperature damping and adhesion performance can be simultaneously provided.

Comparative Example B includes a 5-mil acrylic removable adhesive with Tg,d=−36° C. as a damping layer, and does not include a bonding layer or a carrier layer. Example 2 is a multilayer tape construction as disclosed herein and arranged as in FIG. 2A. The Example 2 tape includes the same damping layer as Comparative Example B, together with a primer 1-mil PET layer as a carrier layer, and 2 mil of Avery Dennison's general purpose Transfer Tape FT1123™ as a bonding layer having Tg,b=−14° C. The damping layer material in Comparative Example B is attractive for use in low-temperature damping due to its low glass transition temperature, and its peak CLF temperature of −8° C. (Table 1). However, as a removable adhesive, this material has very poor adhesion performance, as seen in the results of Table 1.

Figure 5:
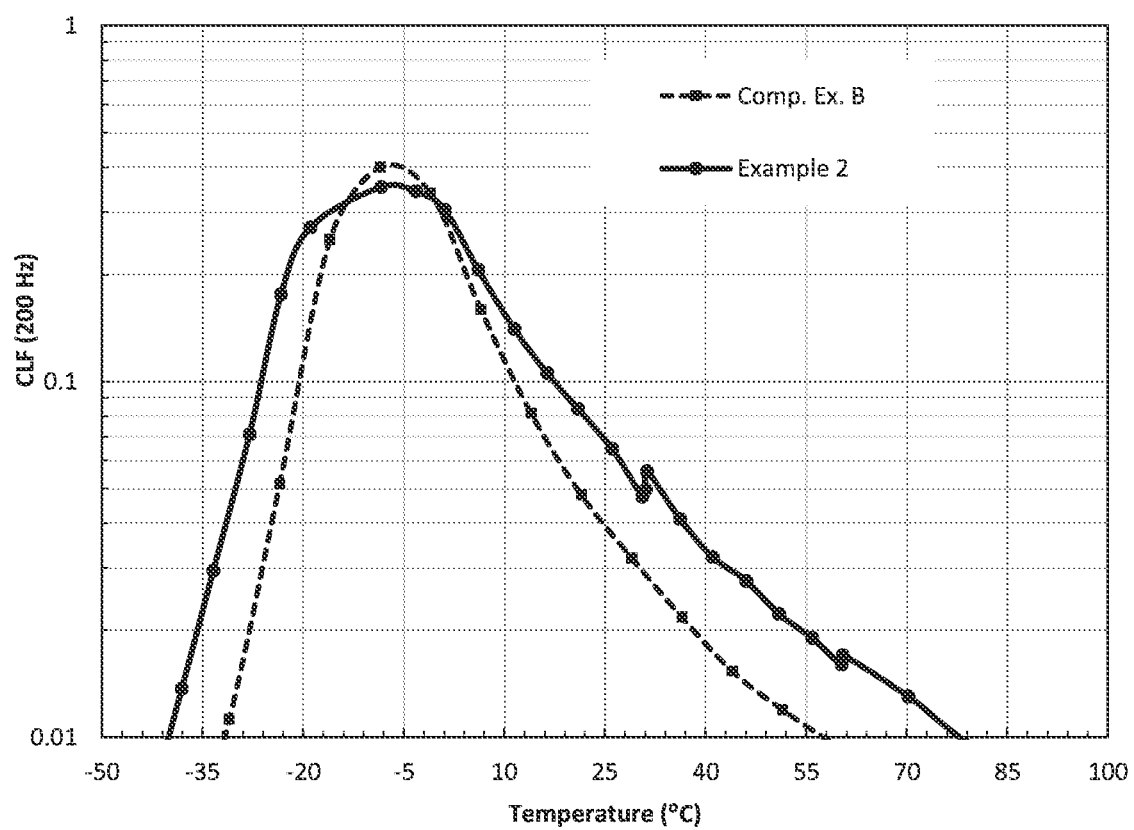
FIG. 5 is a graph of composite loss factors of a comparative damping tape and an exemplary multilayer tape construction as disclosed herein.

In comparison, the Example 2 multilayer tape actually achieves better low-temperature damping performance than Comparative Example B, exhibiting a broader CLF curve (Table 1, FIG. 5). Additionally, because of the presence and composition of its separate bonding layer, the Example 2 tape achieves significantly better peel adhesion than Comparative Example B (Table 1), without compromising damping performance. These results demonstrate the use of the multilayer tape configuration of FIG. 2A and the design parameters disclosed herein for tuning a low-temperature tape adhesion to meet specific peel or shear adhesion requirements without loss in low-temperature damping performance.

Comparative Example C includes a 4-mil acrylic copolymer engineered as a damping layer, wherein the copolymer has been engineered to have a low $T_{g,b}$=−40° C. and to meet high peel adhesion requirements. Comparative Example C does not include a separated bonding layer or a carrier layer. Example 3 is a multilayer tape construction as disclosed herein and arranged as in FIG. 2A. The Example 3 tape includes the same damping layer as Comparative Example C, together with a 2-mil PET layer as a carrier layer, and a different 2-mil acrylic copolymer as s bonding layer with $T\&_b$=−7° C.

Figure 6:
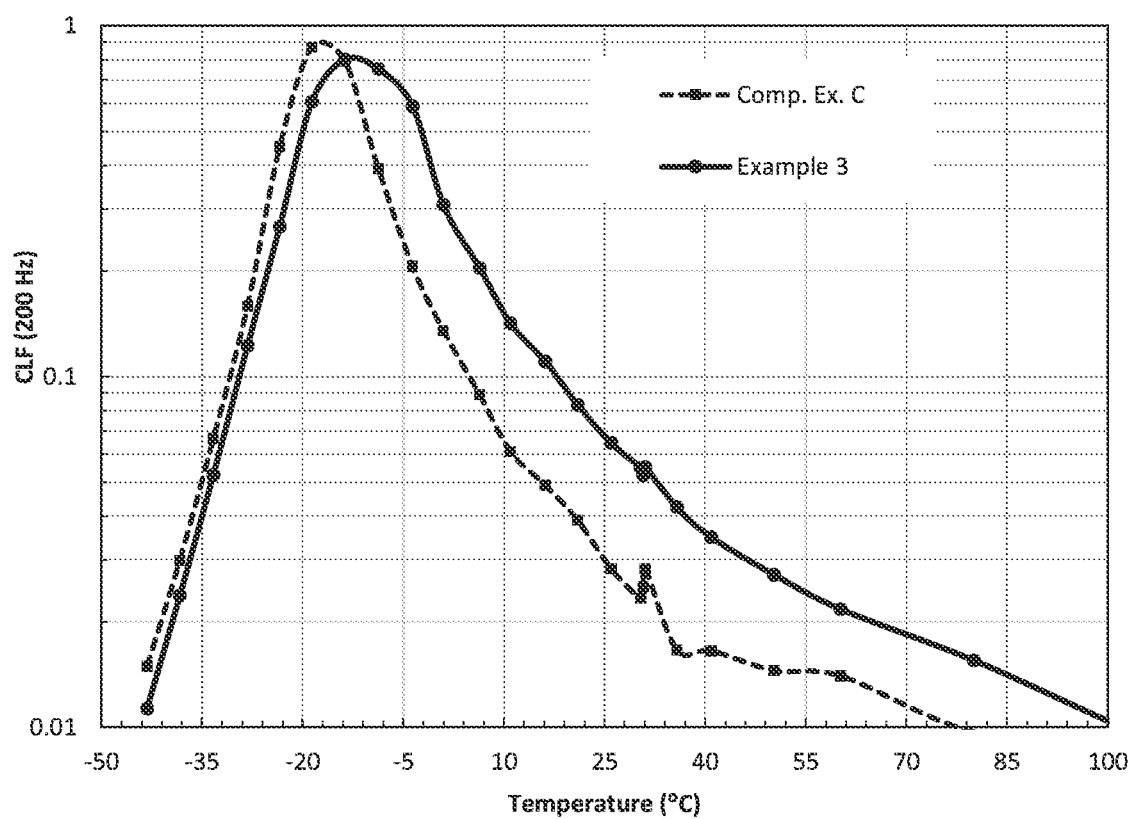
FIG. 6 is a graph of composite loss factors of a comparative damping tape and an exemplary multilayer tape construction as disclosed herein.

The tape of Comparative Example C has a peak CLF temperature of −16° C. (Table 1). While the tape of Example 3 has the same low temperature at peak CLF, the Example 3 tape has an increased CLF width as compared to that of Comparative Example C, resulting in an overall improvement in low-temperature damping performance (Table 1, FIG. 6). In terms of adhesion performance, the Comparative Example C tape is capable of achieving good peel and dynamic shear adhesion, but has reduced static shear performance as seen in the low SAFT value. In contrast, the Example 3 multilayer tape, with its separate viscoelastic layer for bonding, has a comparable peel adhesion to that of Comparative Example C, but displays significantly higher static and dynamic shear adhesion performance. These results demonstrate that improved adhesion and damping performances can be achieved with the disclosed tapes at ultra-low temperatures of −15° C.

Comparative Example D includes a 5-mil acrylic copolymer with Tg=−45° C. designed to be a removable adhesive as a damping layer. Comparative Example D does not include a bonding layer or a carrier layer. Example 4 is a multilayer tape construction as disclosed herein and arranged as in FIG. 2A. The Example 4 tape includes the same damping layer as Comparative Example D, together with a 1-mil primer PET layer as a carrier layer, and a 1-mil layer of Avery Dennison's general purpose Transfer Tape FT1123™ tape having Tg,b=−14° C. as a bonding layer. Example 5 is another multilayer tape construction as disclosed herein and arranged as in FIG. 2A. The Example 5 tape also includes the same damping layer as Comparative Example D and Example 4, and the same carrier layer as Example 4, but incorporates these with the bonding layer of Example 3.

Figure 7:
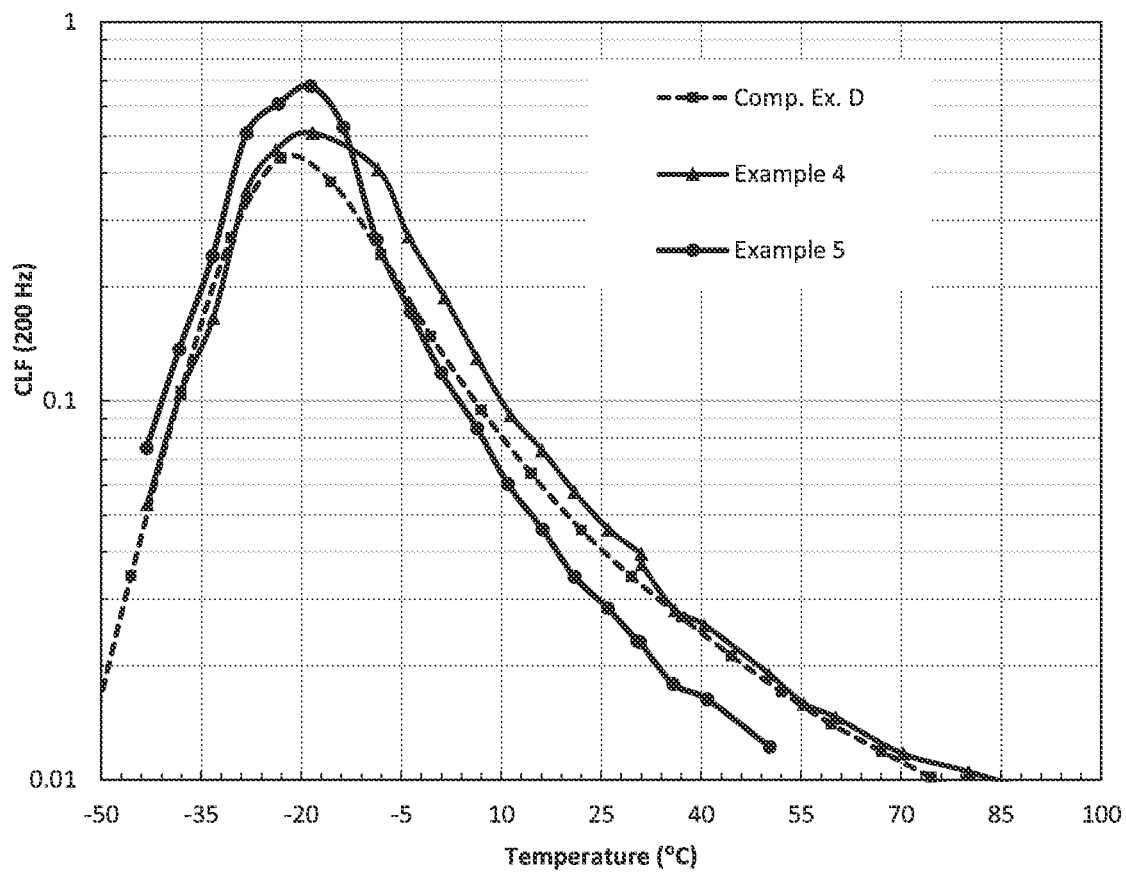
FIG. 7 is a graph of composite loss factors of a comparative damping tape and two exemplary multilayer tape constructions as disclosed herein.

From the data in Table 1 and FIG. 7, Comparative Example D and Examples 4 and 5 each have a peak CLF temperature at approximately −22° C. However, the tape of Comparative Example D has insignificant adhesion performance, as is expected from a removable adhesive, and as is an inevitable consequence of the very low glass transition temperature of the Comparative Example D viscoelastic material. The tape of Example 4 uses a general purpose high $T_g$ copolymer as its separate bonding layer, and as a result is capable of achieving significantly improved adhesion as compared to the Comparative Example D tape. However, since the damping and bonding are localized to different layers, the adhesion properties of the multilayer tape can be improved further by modifying the Example 4 bonding layer as in Example 5. Because the Example 5 tape includes the same damping layer as the Example 4 tape, the damping performances of these tapes are highly similar. The overall adhesion performance of the Example 5 tape, though, is significantly improved beyond that of the Example 4 tape. These results demonstrate that the disclosed multilayer tape constructions allow for tunable adhesion without affecting damping performance at low temperature. This design flexibility, as well as the strong simultaneous adhesion and ultra-low temperature damping performance, cannot be achieved by using a conventional damping treatment having a single viscoelastic damping material layer.

Figure 8:
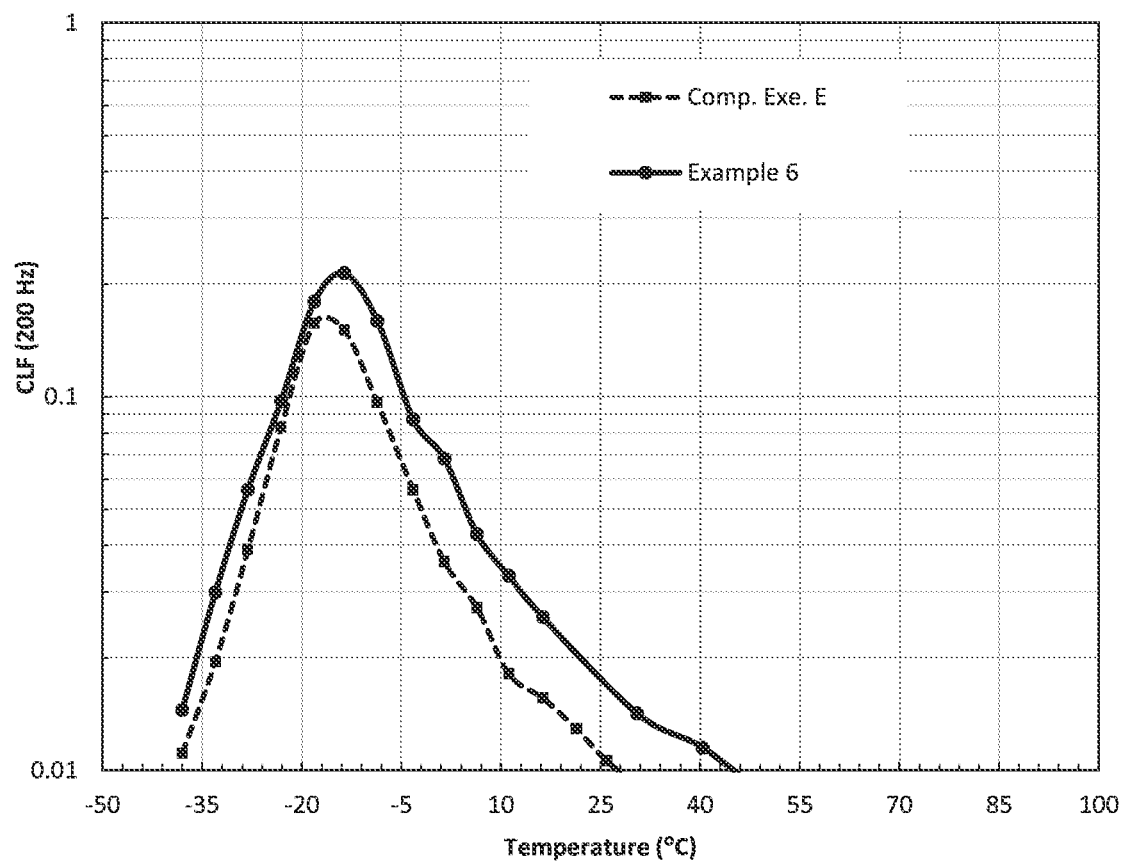
FIG. 8 is a graph of composite loss factors of a comparative damping tape and an exemplary multilayer tape construction as disclosed herein.

Comparative Example E is a CLD treatment including a 5-mil removable adhesive acrylic copolymer as a damping layer (the same polymer used as the damping layer in Comparative Example D and Example 4) laminated to a 10-mil aluminum foil constraining layer. Example 6 is a multilayer tape construction as disclose herein and arranged as a constraining layer damping foil tape as in FIG. 3A. The Example 6 construction includes the same damping layer and constraining layer as Comparative Example E, together with the bonding layer of Example 1, and a 2-mil PET layer as a constraining layer. FIG. 8 shows the CLF versus temperature plot for both Comparative Example E and Example 6. It can be seen from the results shown in the graph that the lamination of a carrier layer and bonding layer to the Comparative Example E tape in order to produce the Example 6 tape leads to no loss in damping performance, with both treatments achieving peak CLF at −15° C. The Example 6 tape actually improves on the damping performance of the Comparative Example 6 tape, exhibiting a higher CLF peak and broader CLF width (FIG. 8). The adhesion performance results (not shown) can be elucidated from Table 1 for the same damping layer and bonding layer combination, also demonstrate that this construction additionally achieves significantly improved adhesion, when compared to those of Comparative Example E.

TABLE 1

Damping Treatments

| | Peak CLF | Temp. at Peak CLF (° C.) | CLF Width (° C.) | Peel Adhesion (N/25 mm) | SAFT (° C.) | Dynamic Shear (N/625 mm²) |
|---|---|---|---|---|---|---|
| Example 1 | 0.50 | −6.0 | 55 | 20.0 | >205 | 400 |
| Example 2 | 0.36 | −8.4 | 45 | 32.0 | 120 | — |
| Example 3 | 0.50 | −15.0 | 48 | 21.0 | >205 | 507 |
| Example 4 | 0.51 | −20.0 | 50 | 32.0 | 94 | 300 |
| Example 5 | 0.60 | −23.4 | 40 | 28.5 | >205 | 550 |
| Comparative Example A | 0.50 | −8.0 | 49 | 40.0 | 98 | 300 |
| Comparative Example B | 0.40 | −8.0 | 31 | 7.0 | 140 | — |
| Comparative Example C | 0.50 | −16.0 | 37 | 27.0 | 115 | 350 |
| Comparative Example D | 0.44 | −23.0 | 43 | 1.8 | 64 | 54 |

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:

1. A multilayer tape construction comprising:
   a damping layer having a damping layer glass transition temperature ($T_{g,d}$), a damping layer thickness ($H_d$), and a damping layer viscoelastic loss factor ($\tan(\delta)_d$) which is equal to or greater than $(10^{-10} H_d^{-2.5} \pm 0.25)$; and
   a bonding layer having a bonding layer glass transition temperature ($T_{g,b}$), a bonding layer thickness ($H_b$), and a bonding layer viscoelastic loss factor ($\tan(\delta)_b$), wherein $T_{g,b}$ is greater than $T_{g,d}$, wherein each of the damping layer and the bonding layer comprises at least one pressure sensitive adhesive selected from the group consisting of silicon adhesives, (meth)acrylic adhesives, rubber adhesives, polyisobutyl/butyl polymers, and hybrid adhesives.

2. The multilayer tape construction of claim 1 having a 200-Hz composite loss factor peak at a temperature less than 0° C.

3. The multilayer tape construction of claim 1, having a peel adhesion greater than 10 N/25 mm.

4. The multilayer tape construction of claim 1, having shear adhesion fail temperature greater than 115° C.

5. The multilayer tape construction of claim 1, having a shear adhesion fail temperature greater than 100° C., a 200-Hz composite loss factor width greater than 40° C., and a 200-Hz composite loss factor peak at a temperature less than −5° C.

6. The multilayer tape construction of claim 1, having a peel adhesion greater than 10 N/25 mm, a dynamic shear greater than 375 N/625 mm², and a 200-Hz composite loss factor peak at a temperature less than −5° C.

7. The multilayer tape construction of claim 1, having a peel adhesion greater than 10 N/25 mm, a dynamic shear greater than 75 N/625 mm², and a 200-Hz composite loss factor peak at a temperature less than −15° C.

8. The multilayer tape construction of claim 1, wherein $(T_{g,b}-T_{g,d})$ is less than $(80\pm40)(H_d/H_b)^{(0.6\pm0.2)}$° C.

9. The multilayer tape construction of claim 1, wherein $(T_{g,b}-T_{g,d})$ is less than $(60\pm40)(H_d/H_b)^{(0.3\pm0.2)}$° C.

10. The multilayer tape construction of claim 1, wherein $T_{g,b}$ ranges from −35° C. to 100° C.

11. The multilayer tape construction of claim 1, wherein $T_{g,d}$ ranges from −80° C. to 0° C.

12. The multilayer tape construction of claim 1, wherein $H_d$ ranges from 0.1 mil to 200 mil.

13. The multilayer tape construction of claim 1, wherein $H_b$ ranges from 0.1 mil to 200 mil.

14. The multilayer tape construction of claim 1, wherein $\tan(\delta)_d$ is measured over a target operating temperature range or over a target operating frequency range.

15. The multilayer tape construction of claim 14, wherein the target operating temperature range is greater than 30° C.

16. The multilayer tape construction of claim 15, wherein the target operating temperature range includes temperatures between −40° C. and 0° C.

17. The multilayer tape construction of claim 14, wherein the target operating frequency range is greater than 240 Hz.

18. The multilayer tape construction of claim 17, wherein the target operating frequency range includes frequencies between 100 Hz and 2000 Hz.

19. The multilayer tape construction of claim 1, wherein $\tan(\delta)_d$ ranges from 1 to 4.

20. The multilayer tape construction of claim 1, wherein $T_{g,b}$ is at least 25° C. greater than $T_{g,d}$, and wherein $\tan(\delta)_d$ is at least 2 greater than $\tan(\delta)_b$.

21. The multilayer tape construction of claim 1, wherein $T_{g,b}$ is less than 25° C. greater than $T_{g,d}$, wherein $H_d$ is greater than or equal to $H_b$, and wherein $\tan(\delta)_d$ is at least 1.5 greater than $\tan(\delta)_b$.

22. The multilayer tape construction of claim 1, wherein $T_{g,b}$ is less than 25° C. greater than $T_{g,d}$, wherein Ha is less than $H_b$, and wherein $\tan(\delta)_d$ is at least 2 greater than $\tan(\delta)_b$.

23. The multilayer tape construction of claim 1, wherein $\tan(\delta)_b$ ranges from 0.5 to 2.5.

24. The multilayer tape construction of claim 1 further comprising a carrier layer, at least a portion of which is disposed between the damping layer and the bonding layer.

25. The multilayer tape construction of claim 24, wherein at least a portion of the damping layer is in direct contact with at least a portion of the carrier layer.

26. The multilayer tape construction of claim 25, wherein the portion of the carrier layer in direct contact with the portion of the damping layer is at least partially coated with one or more coupling agents.

27. The multilayer tape construction of claim 25, wherein the portion of the carrier layer in direct contact with the portion of the damping layer is corona treated.

28. The multilayer tape construction of claim 1, wherein the carrier layer is a first carrier layer, and wherein the multilayer tape construction further comprises at least one additional carrier layer.

29. The multilayer tape construction of claim 1, further comprising:
a constraining layer.

30. The multilayer tape construction of claim 1, wherein the multilayer tape construction further comprises at least one additional bonding layer.

31. The multilayer tape construction of claim 1, wherein the multilayer tape construction further comprises at least one additional damping layer.

32. The multilayer tape construction of claim 1, further comprising:
a first release liner; and
a second release liner.

33. A system comprising:
a base substrate having a substrate extensional stiffness ($K_S$); and
the multilayer tape construction of claim 1.

* * * * *